(12) United States Patent
Cohen et al.

(10) Patent No.: US 8,899,278 B2
(45) Date of Patent: Dec. 2, 2014

(54) PRESSURE CYCLE MANAGEMENT IN COMPRESSED GAS DISPENSING SYSTEMS

(75) Inventors: Joseph Perry Cohen, Bethlehem, PA (US); David John Farese, Riegelsville, PA (US); Ravi Subramanian, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 749 days.

(21) Appl. No.: 13/162,739

(22) Filed: Jun. 17, 2011

(65) Prior Publication Data

US 2012/0318403 A1 Dec. 20, 2012

(51) Int. Cl.
*B65B 1/30* (2006.01)
*F17C 5/06* (2006.01)
*F17C 7/02* (2006.01)

(52) U.S. Cl.
CPC .............. *F17C 5/06* (2013.01); *F17C 2227/043* (2013.01); *F17C 2227/042* (2013.01); *F17C 7/02* (2013.01)
USPC ........ 141/4; 141/18; 141/39; 141/47; 141/94; 141/104; 141/197

(58) Field of Classification Search
CPC ...................... F17C 2227/043; F17C 2227/042; F17C 2227/041; F17C 5/06; F17C 2250/032
USPC .............. 141/4, 197, 18, 47, 94, 248, 39, 104
See application file for complete search history.

(56) References Cited

U.S. PATENT DOCUMENTS

| | | | |
|---|---|---|---|
| 5,406,988 A | 4/1995 | Hopkins | |
| 5,454,408 A * | 10/1995 | DiBella et al. | 141/197 |
| 5,673,735 A | 10/1997 | Crvelin et al. | |
| 6,182,713 B1 | 2/2001 | Deck et al. | |
| 6,619,336 B2 | 9/2003 | Cohen et al. | |
| 6,786,245 B1 | 9/2004 | Eichelberger et al. | |
| 6,792,981 B1 | 9/2004 | Manning et al. | |
| 6,810,925 B2 | 11/2004 | Graham et al. | |
| 7,059,364 B2 * | 6/2006 | Kountz et al. | 141/4 |
| 7,128,103 B2 | 10/2006 | Mitlitsky et al. | |
| 7,178,565 B2 | 2/2007 | Eichelberger et al. | |
| 7,314,056 B2 | 1/2008 | Yamashita et al. | |
| 7,325,561 B2 | 2/2008 | Mathison et al. | |
| 7,415,995 B2 | 8/2008 | Plummer et al. | |
| 2007/0079891 A1 | 4/2007 | Farese et al. | |
| 2009/0151809 A1 | 6/2009 | Balasubramanian et al. | |
| 2009/0194190 A1* | 8/2009 | Casey et al. | 141/4 |
| 2009/0236006 A1 | 9/2009 | Farese et al. | |
| 2009/0250138 A1 | 10/2009 | Bavarian et al. | |
| 2010/0037982 A1 | 2/2010 | Bangs et al. | |
| 2010/0193070 A1 | 8/2010 | Allidieres | |
| 2011/0022337 A1 | 1/2011 | Macron et al. | |

FOREIGN PATENT DOCUMENTS

| | | |
|---|---|---|
| EP | 1146277 A1 | 10/2001 |
| EP | 1452794 A2 | 9/2004 |
| EP | 1760388 A2 | 3/2007 |
| FR | 2841890 A1 | 1/2004 |

(Continued)

*Primary Examiner* — Timothy L Maust
*Assistant Examiner* — Timothy P Kelly
(74) *Attorney, Agent, or Firm* — Bryan C. Hoke, Jr.

(57) ABSTRACT

A method for dispensing compressed gas from two or more compressed gas storage volumes to receiving vessel such as vehicle fuel tanks. Control instructions are provided to cycle the compressed gas storage volumes through pressure cycles in a rolling rotating cascading manner such that each of the compressed gas storage volumes cycle from an upper pressure limit to a lower pressure limit.

13 Claims, 7 Drawing Sheets

(56) References Cited

FOREIGN PATENT DOCUMENTS

| | | |
|---|---|---|
| JP | 2001295994 | 10/2001 |
| JP | 2004084808 A | 3/2004 |
| JP | 2004-293752 | 10/2004 |
| JP | 2004293752 A | 10/2004 |
| JP | 2010534308 A | 4/2008 |
| WO | 2009079276 A2 | 6/2009 |
| WO | 2011049466 A1 | 4/2011 |

* cited by examiner

US 8,899,278 B2

PRESSURE CYCLE MANAGEMENT IN COMPRESSED GAS DISPENSING SYSTEMS

BACKGROUND

The dispensing of compressed gas from compressed gas storage systems to lower-pressure receiving vessels is known in the art for various applications such as supplying fuel to compressed natural gas (CNG)-powered or hydrogen-powered vehicles. A compressed gas storage system typically comprises multiple high-pressure gas storage volumes with a piping and valve system to dispense gas to the lower-pressure receiving vessel sequentially from each of the high-pressure gas storage volumes and a gas supply system to refill the gas storage volumes after dispensing is complete. A storage volume may comprise a single vessel or a bank of vessels.

Typical dispensing processes that transfer gas sequentially from each of the compressed gas storage volumes to lower-pressure receiving vessels are known in the art as cascade dispensing processes. Examples of cascade dispensing processes are disclosed in U.S. Pat. Nos. 5,406,988, 5,673,735, 6,779,568 B2, and 7,128,103 B2, and U.S. Patent Application Publication Nos. 2003/0175564 A1, 2006/0260950A1, and 2007/0125441 A1.

In a cascade process, the lower-pressure receiving vessel is filled at increasing pressures from each of a plurality of compressed gas storage volumes in sequence wherein each gas storage volume operates within a given pressure range for each fill step. For example, in a system with three compressed gas storage volumes each containing gas at an upper gas storage pressure, a first gas storage volume dispenses gas to the receiving vessel from an initial pressure to a first intermediate pressure, a second storage volume dispenses gas to the receiving vessel from the first intermediate pressure to a second intermediate pressure, and a third storage volume dispenses gas to the receiving vessel from the second intermediate pressure to a final fill pressure. The storage volumes are refilled from a gas source to the upper gas storage pressure, and gas is dispensed subsequently to another lower-pressure receiving vessel in the same manner. In each subsequent dispensing step, therefore, the first gas storage volume always dispenses gas in a lower pressure range, the second storage volume always dispenses gas in an intermediate pressure range, and the third storage volume always dispenses gas in a higher pressure range.

The use of cascade gas dispensing systems will grow substantially with the anticipated growth in the number of compressed gas-fueled motor vehicles in coming years. Improvements in the design and operation of cascade gas dispensing systems will be needed to ensure efficient operation and upper operating life of future cascade gas dispensing systems. This need is addressed by the aspects of the invention described below and defined by the claims that follow.

BRIEF SUMMARY

There are several aspects of the present method as outlined below.

Aspect #1. A method for dispensing a compressed gas from a plurality of compressed gas storage volumes, wherein the plurality of compressed gas storage volumes are operated in a pressure range ranging from a lower gas storage pressure, $P_{LOWER}$, to an upper gas storage pressure, $P_{UPPER}$, inclusive, the method comprising: providing control instructions whereby the pressure in each of the plurality of compressed gas storage volumes is cycled through pressure cycles during which compressed gas is withdrawn from each of the plurality of compressed gas storage volumes and compressed gas is introduced into each of the plurality of compressed gas storage volumes, the pressure cycles for each of the plurality of compressed gas storage volumes independent from one another, the pressure cycles for each of the plurality of compressed gas storage volumes having a pressure decrease portion and a pressure increase portion subsequent to the pressure decrease portion, wherein the pressure during the pressure decrease portion progresses from within 7.5 MPa of $P_{UPPER}$ to within 7.5 MPa of $P_{LOWER}$ (or from within 5 MPa of $P_{UPPER}$ to within 5 MPa of $P_{LOWER}$) and the pressure increase portion progresses from within 7.5 MPa of $P_{LOWER}$ P to within 7.5 MPa of $P_{UPPER}$, (or from within 5 MPa of $P_{LOWER}$ to within 5 MPa of $P_{UPPER}$) wherein the pressure in each of the compressed gas storage volumes is not increased at any time during the pressure decrease portion of the pressure cycles and the pressure in each of the compressed gas storage volumes is not decreased at any time during the pressure increase portion of the pressure cycles.

Aspect #2. The method of aspect #1 further comprising:
(a) dispensing from a first of the plurality of compressed gas storage volumes into a first receiving vessel, the first of the plurality of compressed gas storage volumes initially at a first pressure, $P_1$, where $P_{LOWER} < P_1 \leq P_{UPPER}$;
(b) terminating dispensing from the first of the plurality of compressed gas storage volumes when the pressure in the first of the plurality of compressed gas storage volumes is within 7.5 MPa of $P_{LOWER}$ (or within 5 MPa of $P_{LOWER}$);
(c) subsequent to step (b), dispensing from a second of the plurality of compressed gas storage volumes into the first receiving vessel, the second of the plurality of compressed gas storage volumes initially at a second pressure, $P_2$, where $P_{LOWER} < P_2 \leq P_{UPPER}$; and
(d) terminating dispensing from the second of the plurality of compressed gas storage volumes when the first receiving vessel is filled to a desired level for the first receiving vessel.

Aspect #3. The method of aspect #2 wherein the dispensing is terminated in step (b) without regard to the pressure difference between the first compressed gas storage volume and the first receiving vessel.

Aspect #4. The method of aspect #2 or aspect #3 wherein the dispensing is terminated in step (b) without regard to the instantaneous flow rate of the compressed gas from the first compressed gas storage volume to the first receiving vessel.

Aspect #5. The method of any one of aspects #2 to #4 further comprising:
subsequent to step (b), dispensing from another of the plurality of compressed gas storage volumes into the first receiving vessel, the other of the plurality of compressed gas storage volumes initially having a pressure within 7.5 MPa of $P_{UPPER}$ (or within 5 MPa of $P_{UPPER}$); and
terminating dispensing from the other of the plurality of compressed gas storage volumes when the pressure in the other compressed gas storage volume is within 7.5 MPa of $P_{LOWER}$ (or within 5 MPa of $P_{LOWER}$).

Aspect #6. The method of any one of aspects #2 to #5 wherein the second of the plurality of compressed gas storage volumes has a pressure $P_3$ upon terminating dispensing in step (d), the method further comprising:
(e) dispensing from the second of the plurality of compressed gas storage volumes into a second receiving vessel, the second of the plurality of compressed gas storage volumes initially at the pressure, $P_3$;

(f) terminating dispensing from the second of the plurality of compressed gas storage volumes when the pressure in the second of the plurality of compressed gas storage volumes is within 7.5 MPa of $P_{LOWER}$ (or within 5 MPa of $P_{LOWER}$);

(g) subsequent to step (f), dispensing from a third of the plurality of compressed gas storage volumes into the second receiving vessel, the third of the plurality of compressed gas storage volumes initially at a fourth pressure, $P_4$, where $P_{LOWER} < P_4 \leq P_{UPPER}$; and (h) terminating dispensing from the third of the plurality of compressed gas storage volumes when the second receiving vessel is filled to a desired level for the second receiving vessel.

Aspect #7. The method of any one of aspects #2 to #5 wherein the second of the plurality of compressed gas storage volumes has a pressure $P_3$ upon terminating dispensing in step (d), the method further comprising:

(e) dispensing from the second of the plurality of compressed gas storage volumes into a second receiving vessel, the second of the plurality of compressed gas storage volumes initially at the pressure, $P_3$;

(f) terminating dispensing from the second of the plurality of compressed gas storage volumes when the pressure in the second of the plurality of compressed gas storage volumes is within 7.5 MPa of $P_{LOWER}$ (or within 5 MPa of $P_{LOWER}$);

(g') subsequent to step (f), dispensing from the first of the plurality of compressed gas storage volumes into the second receiving vessel, the first of the plurality of compressed gas storage volumes initially within 7.5 MPa of $P_{UPPER}$ (or within 5 MPa of $P_{UPPER}$) ; and (h') terminating dispensing from the first of the plurality of compressed gas storage volumes when the second receiving vessel is filled to a desired level for the second receiving vessel.

Aspect #8. The method of aspect #7 wherein additional compressed gas is added to the first of the plurality of compressed gas storage volumes after step (b) and before step (g) to increase the pressure in the first of the plurality of compressed gas storage volumes from within 7.5 MPa of $P_{LOWER}$ to within 7.5 MPa of $P_{UPPER}$ (or from within 5 MPa of $P_{LOWER}$ to within 5 MPa of $P_{UPPER}$).

Aspect #9. The method of any one of aspects #2 to #8 wherein during step (a), compressed gas is introduced into the first of the plurality of compressed gas storage volumes from a compressed gas source.

Aspect #10. The method of any one of aspects #2 to #8 wherein during step (c), compressed gas is introduced into the second of the plurality of compressed gas storage volumes from a compressed gas source.

Aspect #11. The method of any one of aspects #2 to #8 wherein during step (a), compressed gas is also introduced into the first receiving vessel from a compressor.

Aspect #12. The method of any one of aspects #2 to #8 wherein during step (c), compressed gas is introduced into the first receiving vessel from a compressor.

Aspect #13. The method of any one of the preceding claims further comprising:

providing secondary control instructions to introduce compressed gas into each of the plurality of compressed gas storage volumes until the pressure in each of the plurality of compressed gas storage volumes is within 7.5 MPa of $P_{UPPER}$ (or within 5 MPa of $P_{UPPER}$) wherein the secondary control instructions are provided independent of the pressure in each of plurality of compressed gas storage volumes preceding this step of providing the control instructions to introduce compressed gas.

DETAILED DESCRIPTION

Figure 1:
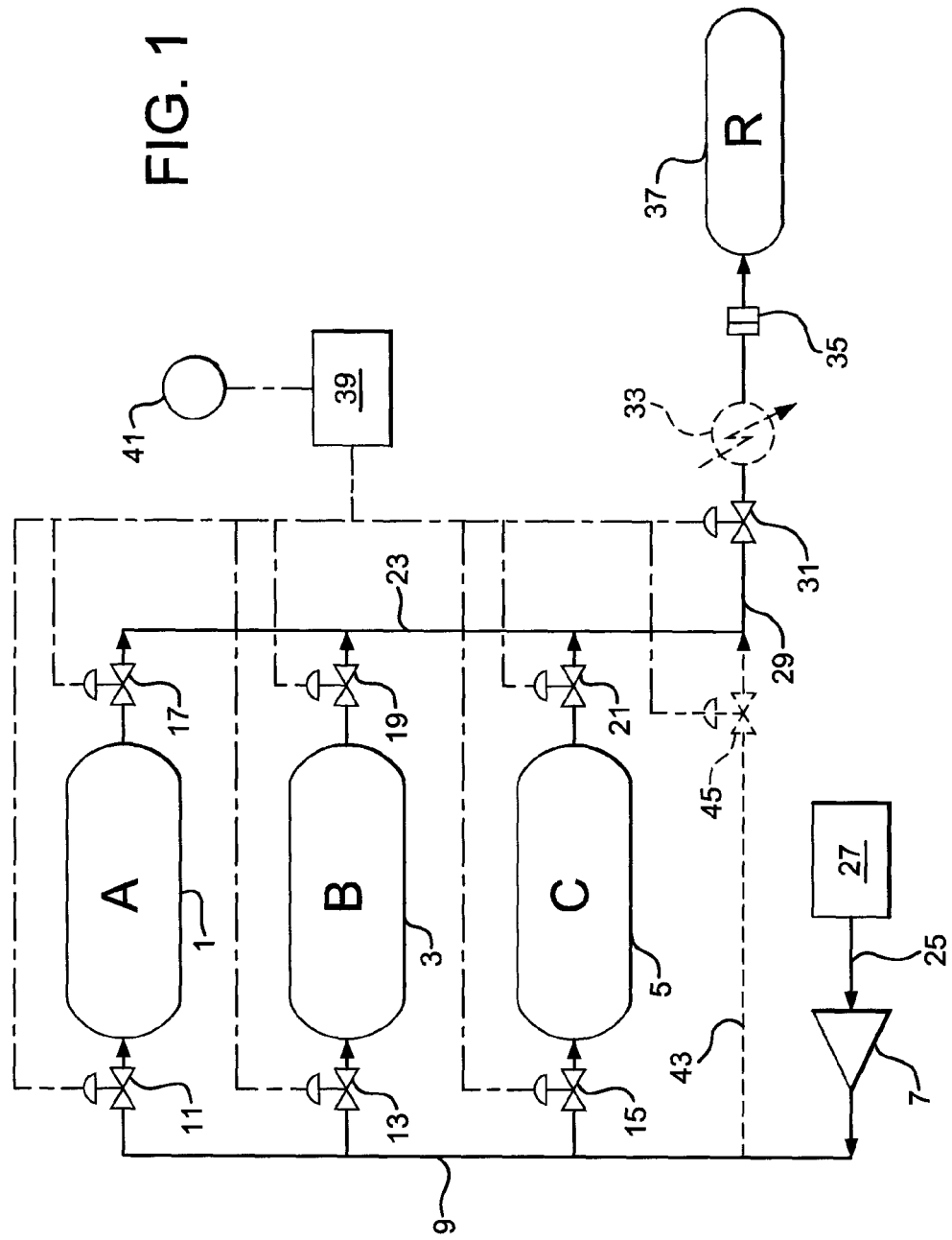
FIG. 1 is a schematic process flow diagram of a compressed gas storage and dispensing system.

The present invention relates to a method for dispensing compressed gas in a series of compressed gas dispensing steps from a compressed gas dispensing system having two or more compressed gas storage volumes.

Compressed natural gas (CNG) and hydrogen are typical components dispensed from these compressed gas dispensing systems. These systems are subjected to wide ranges of ambient temperatures which are well above the critical temperatures of hydrogen (−240° C. (−400° F.)) and methane (−83° C. (−117° F.)), so that these components typically are stored and dispensed as supercritical fluids rather than gases according to strict thermodynamic definitions. However, the terms "gas" and "compressed gas" are typically used in the art as generic terms for both gases and supercritical fluids. In the present disclosure, the terms "gas" and "compressed gas" may be used interchangeably and are meant to include elements and compounds in both thermodynamic states of gas and supercritical fluid.

The terms "compressed gas storage volume" or "gas storage volume" are equivalent and are defined to include a single gas storage vessel and/or a plurality of gas storage vessels that are connected together to operate collectively as a single combined gas storage volume. When gas is withdrawn from a gas storage volume comprising a plurality of gas storage vessels, gas is withdrawn from each of the plurality of gas storage volumes simultaneously during the dispensing step. The plurality of vessels that are connected and operated in this manner may be defined as a bank of vessels.

The terms "compressed gas receiving vessel" and "gas receiving vessel" are equivalent and are defined as a gas storage volume that is filled with gas from a compressed gas storage volume during the dispensing step of a gas dispensing cycle. The compressed gas receiving vessel may be the fuel tank of a vehicle such as a car, truck, forklift, or bus.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of (1) the first entity, (2) the second entity, and (3) the first entity and the second entity. The term "and/or" placed between the last two entities of a list of 3 or more entities means at least one of the entities in the list.

As used herein, "plurality" means two or more.

As used herein, "in fluid flow communication with" means operatively connected by one or more conduits, manifolds, valves and the like, for transfer of fluid. A conduit is any pipe, tube, passageway or the like, through which a fluid may be conveyed. An intermediate device, such as a pump, compressor, heat exchanger, or vessel, may be present between a first device in fluid flow communication with a second device unless explicitly stated otherwise.

The term "in fluid flow communication with" as applied to a first and second region or volume means that a fluid can flow from the first region or volume to the second region or volume through connecting piping and/or an intermediate region or volume. The terms "connecting" and "connected to" as applied to a first and second region or volume means that a fluid can flow from the first region or volume to the second region or volume through connecting piping. The term "in fluid flow communication with" applies to systems in which a valve is installed between the first and second region or volume such that (1) gas flow actually occurs, i.e., when the valve is open, or (2) gas flow can potentially occur, i.e., when the valve is closed and has the potential for being opened.

The adjective "open" when applied to a flow control valve means any position of the valve flow control member, e.g., a valve stem, diaphragm, butterfly, rotating ball, and the like, that allows gas to flow through the valve. The adjective "open" thus may apply to a partially-open or fully-open flow control valve. The verbs "open" and "opening" mean the act of moving the valve flow control member from a closed position to a partially open position or to a fully open position. The term "closed" has the usual meaning of a valve in which no gas flow occurs because the flow control member is in the closed position.

Downstream and upstream refer to the intended flow direction of the process fluid transferred. If the intended flow direction of the process fluid is from the first device to the second device, the second device is in downstream fluid flow communication of the first device.

An exemplary compressed gas storage and dispensing system is illustrated in FIG. 1 and has three compressed gas storage volumes A, B, and C designated by reference numerals 1, 3, and 5, respectively. Each of these compressed gas storage volumes may be a single gas storage vessel as shown or alternatively may be a plurality of gas storage vessels arranged in series and/or in parallel wherein the plurality of gas storage vessels for each gas storage volume are in fluid flow communication with each other to operate collectively as a single combined gas storage volume. The inlets of the three compressed gas storage volumes 1, 3, and 5, are connected to compressor 7 via manifold 9 and respective inlet flow control valves 11, 13, and 15, and the outlets of the gas storage volumes are connected via respective flow control valves 17, 19, and 21 to dispensing manifold 23. Compressor 7 is connected via conduit 25 to gas source 27, which may be at least one of a pipeline, a large gas storage vessel, a plurality of gas storage vessels, and a liquefied gas storage and vaporization system.

While three compressed gas storage volumes are illustrated in FIG. 1, the present method applies to compressed gas storage and dispensing systems having two or more compressed gas storage volumes.

Dispensing manifold 23 is connected to coupling 35 via dispensing conduit 29, dispensing flow control valve 31, and optional heat exchanger 33. Optional heat exchanger 33 may be used to cool the compressed gas just prior to introducing the compressed gas into a receiving vessel. Coupling 35 is adapted to connect the compressed gas storage and dispensing system to the compressed gas receiving vessel R shown by reference numeral 37.

The term "gas dispensing pressure" may refer to the pressure at coupling 35 or at the inlet to compressed gas receiving vessel R during a dispensing step.

Valves 11, 13, 15, 17, 19, 21, and 31 are controlled by controller 39 via their respective control signal lines. Controller 39 may be a computer, a programmable logic controller (PLC), or any other type of controller known in the art for the appropriate operation of valves 11, 13, 15, 17, 19, 21, and 31 during the step of gas dispensing and the step of refilling compressed gas storage volumes A, B, and C. Controller 39 may also control the operation of compressor 7. Controller 39 may receive input from temperature measurement element 41, which measures the ambient temperature. The value of the ambient temperature measurement may be used to affect the pressure rise rate or flow rate of the gas being dispensed.

Figure 2:
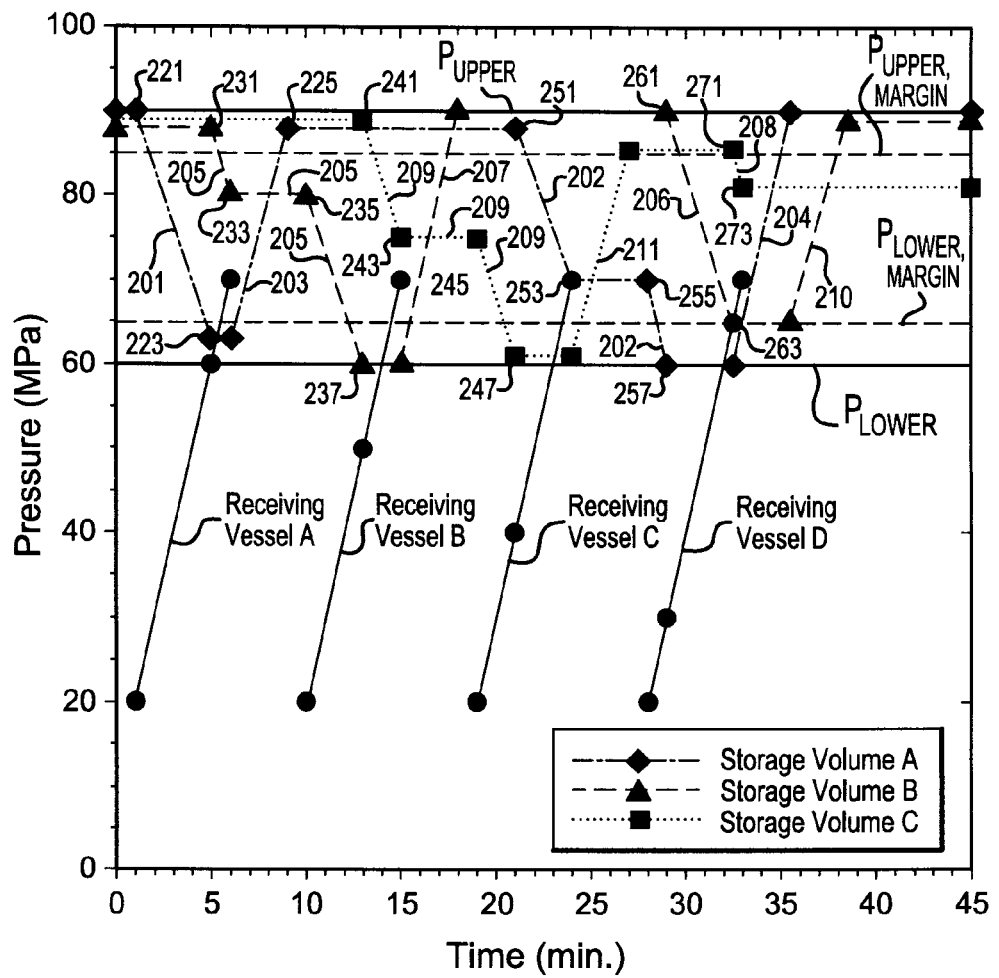
FIG. 2 is a generalized plot of pressure vs. elapsed time for a rolling rotating cascade dispensing process utilizing the compressed gas storage and dispensing system of FIG. 1.

The present method for dispensing compressed gas from a plurality of compressed gas storage volumes is described with reference to FIG. 2. FIG. 2 represents an exemplary generalized pressure versus elapsed time plot for a dispensing system having three compressed gas storage volumes, however any number of compressed gas storage volumes greater than one may be used.

Each of the plurality of compressed gas storage volumes are operated in a pressure range ranging from a lower gas storage pressure, $P_{LOWER}$, to an upper gas storage pressure, $P_{UPPER}$, inclusive. Compressed gas storage volumes generally have a design pressure cycle limit. For example, the compressed gas storage volumes in FIG. 2 are shown to have a lower gas storage pressure, $P_{LOWER}$, of 60 MPa and an upper gas storage pressure, $P_{UPPER}$, of 90 MPa. The upper gas storage pressure, $P_{UPPER}$, may be the maximum allowable working pressure or some value less than the maximum allowable working pressure. The ASME standard states that the maximum allowable working pressure for a vessel is the maximum pressure permissible at the top of the vessel in its normal operating position at the designated coincident temperature specified for that pressure. The lower gas storage pressure, $P_{LOWER}$, is typically greater than zero, both because the cyclic stresses on the vessel are increased for a greater difference between lower gas storage pressure, $P_{LOWER}$, and the upper gas storage pressure, $P_{UPPER}$, and because the ability of the storage vessel to provide compressed gas to a receiving vessel decreases unsuitably as the lower gas storage pressure, $P_{LOWER}$, approaches zero.

The method comprises providing particular primary control instructions. The method may also comprise providing one or more sets of secondary control instructions.

The pressure in each of the plurality of compressed gas storage volumes is cycled through pressure cycles. During a pressure cycle for a compressed gas storage volume, compressed gas is withdrawn for dispensing to one or more receiving vessels thereby decreasing the pressure in the compressed gas storage volume, and compressed gas is later introduced into the compressed gas storage volume thereby increasing the pressure in the compressed gas storage volume. The pressure cycles for each of the plurality of compressed gas storage volumes are independent from one another, that is, they are temporally displaced from one another. As shown in FIG. 2, the pressure cycles for each compressed gas storage volume do not overlay each other in the plot. The pressure in each compressed gas storage volume increases and decreases independently of the other compressed gas storage volumes.

Each pressure cycle has a pressure decrease portion and a pressure increase portion subsequent to the pressure decrease portion. For example, referring to FIG. 2, storage volume A has a pressure decrease portion 201, followed by pressure increase portion 203. Storage volume B has a pressure decrease portion 205 followed by a pressure increase portion 207. Storage volume C has a pressure decrease portion 209 followed by a pressure increase portion 211.

According to the primary control instructions of the present method, the pressure during the pressure decrease portion progresses from within 7.5 MPa of $P_{UPPER}$ to within 7.5 MPa of $P_{LOWER}$. In one or more embodiments, the pressure during the pressure decrease portion progresses from within 5 MPa of $P_{UPPER}$ to within 5 MPa of $P_{LOWER}$. In one or more embodiments, the pressure during the pressure decrease portion progresses from within 2 MPa of $P_{UPPER}$ to within 1 MPa of $P_{LOWER}$. In FIG. 2, the margin between $P_{UPPER}$ and the tolerance of 5 MPa is denoted as $P_{UPPER, MARGIN}$, and the margin between $P_{LOWER}$ and the tolerance of 5 MPa is denoted as $P_{LOWER, MARGIN}$.

According to the primary control instructions of the present method, the pressure during the pressure increase portion progresses from within 7.5 MPa of $P_{LOWER}$ to within 7.5 MPa of $P_{UPPER}$. In one or more embodiments, the pressure during the pressure increase portion progresses from within 5 MPa of $P_{LOWER}$ to within 5 MPa of $P_{UPPER}$. In one or more embodiments, the pressure during the pressure increase portion progresses from within 1 MPa of $P_{LOWER}$ to within 2 MPa of $P_{UPPER}$.

The primary control instructions are characterized by the pressure in each of the compressed gas storage volumes not increasing at any time during the pressure decrease portion of the pressure cycle and the pressure in each of the compressed gas storage volumes not decreasing at any time during the pressure increase portion of the pressure cycles.

These characteristics are illustrated in FIG. 2, which is meant to illustrate but not intended to limit the method.

For simplicity, the plotted profiles of pressure vs. elapsed time are shown in the figures as being linear, which is a simplification for illustration purposes. In actual operations, these profiles may be non-linear; also, the profiles may be discontinuous, as there may be one or more interruptions during a dispensing cycle for hose checks as required by the National Fire Protection Association (NFPA).

For the purpose of illustration, $P_{UPPER}$ is 90 MPa and $P_{LOWER}$ is 60 MPa in FIG. 2.

Storage volume A, initially at 90 MPa ($P_{UPPER}$), corresponding to point 221, is used to dispense compressed gas to receiving vessel A initially at 20 MPa. The pressure in storage volume A decreases along path 201 corresponding to the pressure decrease portion of the pressure cycle, while at the same time the pressure increases in the receiving vessel A. At 5 minutes on the plot in FIG. 2, dispensing from storage volume A stops, corresponding to point 223. The pressure in storage volume A at point 223 is 63 MPa and is within 7.5 MPa of $P_{LOWER}$ as required by the present method.

Storage volume B, initially at 88 MPa (within 7.5 MPa of $P_{UPPER}$), corresponding to point 231, is then used to complete the fill to receiving vessel A. Compressed gas is dispensed from storage volume B to receiving vessel A. The pressure in storage volume B decreases along path 205, corresponding to the pressure decrease portion of the pressure cycle for storage volume B, while at the same time the pressure increases in receiving vessel A until it reaches 70 MPa, the final fill pressure for receiving vessel A. The pressure in storage volume B decreases to 80 MPa when receiving vessel A reaches its final fill pressure, here 70 MPa.

Subsequent to the pressure decrease portion 201, storage volume A, having been depleted of compressed gas, then undergoes a pressure increase portion along path 203 where compressed gas is introduced into storage volume A until it reaches a pressure of 88 MPa. Compressed gas is introduced into storage volume A at least until the pressure in storage volume A is within 7.5 MPa of $P_{UPPER}$.

As illustrated in FIG. 2, the pressure in storage volume A is not increased at any time during the pressure decrease portion path 201, and the pressure in storage volume A is not decreased at any time during the pressure increase portion path 203.

At 10 minutes on the plot in FIG. 2, storage volume B, at 80 MPa, corresponding to point 235, is used to dispense compressed gas to a receiving vessel B initially at 20 MPa. The pressure in storage volume B decreases further along path 205 corresponding to the pressure decrease portion of the pressure cycle for storage volume B, while at the same time the pressure increases in receiving vessel B. At 13 minutes on the plot in FIG. 2, dispensing from storage volume B stops, corresponding to point 237. The pressure in storage volume B at point 237 is 60 MPa ($P_{LOWER}$), and is therefore within 7.5 MPa of $P_{LOWER}$ as required by the present method.

Storage volume C, initially at 89 MPa (within 7.5 MPa of $P_{UPPER}$), corresponding to point 241, is then used to complete the fill to receiving vessel B. Compressed gas is dispensed from storage volume C to receiving vessel B. The pressure in storage volume C decreases along path 209, corresponding to the pressure decrease portion of the pressure cycle for storage volume C, while at the same time the pressure increases in receiving vessel B until it reaches 70 MPa, the final fill pressure for receiving vessel B. The pressure in storage volume C decreases to 75 MPa at point 243 when receiving vessel B reaches its final fill pressure.

Subsequent to the pressure decrease portion 205, storage volume B, having been depleted of compressed gas, then undergoes a pressure increase portion along path 207 where compressed gas is introduced into storage volume B until it reaches a pressure of 90 MPa ($P_{UPPER}$). Compressed gas is introduced into storage volume B at least until the pressure in storage volume B is within 7.5 MPa of $P_{UPPER}$.

As illustrated in FIG. 2, the pressure in storage volume B is not increased at any time during the pressure decrease portion path 205, and the pressure in storage volume B is not decreased at any time during the pressure increase portion path 207. As illustrated in FIG. 2, a pressure decrease portion may include a period where the pressure is constant. Likewise, a pressure increase portion may include a period where the pressure is constant.

At 19 minutes on the plot in FIG. 2, storage volume C, at 75 MPa, corresponding to point 245, is used to dispense compressed gas to a receiving vessel C initially at 20 MPa. The pressure in storage volume C decreases further along path 209 corresponding to the pressure decrease portion of the pressure cycle for storage volume C, while at the same time the pressure increases in receiving vessel C. At 21 minutes on the plot in FIG. 2, dispensing from storage volume C stops, corresponding to point 247. The pressure in storage volume C at point 247 is 61 MPa, and is therefore within 7.5 MPa of $P_{LOWER}$ as required by the present method.

Storage volume A, having been refilled to 88 MPa (within 7.5 MPa of $P_{UPPER}$), corresponding to point 251, is then used to complete the fill to receiving vessel C. Compressed gas is dispensed from storage volume A to receiving vessel C. The pressure in storage volume A decreases along path 202, corresponding to a pressure decrease portion of another pressure cycle for storage volume A, while at the same time the pressure increases in receiving vessel C until it reaches 70 MPa, the final fill pressure for receiving vessel B. The pressure in storage volume A decreases to 70 MPa at point 253 when receiving vessel C reaches its final fill pressure.

Subsequent to the pressure decrease portion 209, storage volume C, having been depleted of compressed gas, then undergoes a pressure increase portion along path 211 where compressed gas is introduced into storage volume C until it reaches a pressure of 85.5 MPa. Compressed gas is introduced into storage volume C at least until the pressure in storage volume C is within 7.5 MPa of 90 MPa ($P_{UPPER}$).

As illustrated in FIG. 2, the pressure in storage volume C is not increased at any time during the pressure decrease portion path 209, and the pressure in storage volume C is not decreased at any time during the pressure increase portion path 211. As illustrated in FIG. 2, a pressure decrease portion may include a period where the pressure is constant. Likewise, a pressure increase portion may include a period where the pressure is constant.

At 28 minutes on the plot in FIG. 2, storage volume A, at 70 MPa, corresponding to point 255, is used to dispense compressed gas to a receiving vessel D initially at 20 MPa. The pressure in storage volume A decreases further along path 202 corresponding to a pressure decrease portion of the pressure cycle for storage volume A, while at the same time the pressure increases in receiving vessel D. At 29 minutes on the plot in FIG. 2, dispensing from storage volume A stops, corresponding to point 257. The pressure in storage volume A at point 257 is 60 MPa ($P_{LOWER}$) and is therefore within 7.5 MPa of $P_{LOWER}$ as required by the present method.

Storage volume B, having been refilled to 90 MPa (within 7.5 MPa of $P_{UPPER}$), corresponding to point 261, is then used to complete the fill to receiving vessel D. Compressed gas is dispensed from storage volume B to receiving vessel D. The pressure in storage volume B decreases along path 206, corresponding to a pressure decrease portion of another pressure cycle for storage volume B, while at the same time the pressure increases in receiving vessel D until storage volume B and receiving vessel D equilibrate at 65 MPa at point 263.

Storage volume C, having been refilled to 85.5 MPa (within 7.5 MPa of $P_{UPPER}$), corresponding to point 271, is then used to complete the fill to receiving vessel D. Compressed gas is dispensed from storage volume C to receiving vessel D. The pressure in storage volume C decreases along path 208, corresponding to a pressure decrease portion of another pressure cycle for storage volume C, while at the same time the pressure increases in receiving vessel D until it reaches 70 MPa, the final fill pressure for receiving vessel D. The pressure in storage volume C decreases to 81 MPa at point 273 when receiving vessel D reaches its final fill pressure.

The pressure in storage volume B decreases to 65 MPa at point 263 when receiving vessel D and storage volume B equilibrate at 65 MPa, which is within 7.5 MPa of $P_{LOWER}$.

Subsequent to the pressure decrease portion 202, storage volume A, having been depleted of compressed gas, then undergoes a pressure increase portion along path 204 where compressed gas is introduced into storage volume A until it reaches a pressure of 90 MPa ($P_{UPPER}$). Compressed gas is introduced into storage volume A at least until the pressure in storage volume A is within 7.5 MPa of 90 MPa ($P_{UPPER}$).

As illustrated in FIG. 2, the pressure in storage volume A is not increased at any time during the pressure decrease portion path 202, and the pressure in storage volume A is not decreased at any time during the pressure increase portion path 204. As illustrated in FIG. 2, a pressure decrease portion may include a period where the pressure is constant. Likewise, a pressure increase portion may include a period where the pressure is constant.

Subsequent to the pressure decrease portion 206, storage volume B, having been depleted of compressed gas, then undergoes a pressure increase portion along path 210 where compressed gas is introduced into storage volume B until it reaches a pressure of 89 MPa. Compressed gas is introduced into storage volume B at least until the pressure in storage volume B is within 7.5 MPa of 90 MPa (P UPPER).

As illustrated in FIG. 2, the pressure in storage volume B is not increased at any time during the pressure decrease portion path 206, and the pressure in storage volume B is not decreased at any time during the pressure increase portion path 210. As illustrated in FIG. 2, a pressure decrease portion and a pressure increase portion may include one or more periods where the pressure is constant.

Utilization of the storage volumes is increased as the difference between $P_{UPPER}$ and $P_{UPPER, MARGIN}$ is decreased and as the difference between $P_{LOWER}$ and $P_{LOWER, MARGIN}$ is decreased, utilization defined as an average amount of compressed gas dispensed per pressure cycle over the life of the system.

The method may further comprise:
(a) dispensing from a first of the plurality of compressed gas storage volumes into a first receiving vessel, the first of the plurality of compressed gas storage volumes initially (i.e. at the time of initiating dispensing in this step) at a first pressure, $P_1$, where $P_{LOWER} < P_1 \leq P_{UPPER}$ ;
(b) terminating dispensing from the first of the plurality of compressed gas storage volumes when the pressure in the first of the plurality of compressed gas storage volumes is within 7.5 MPa of $P_{LOWER}$ (or within 5 MPa of $P_{LOWER}$);
(c) subsequent to step (b), dispensing from a second of the plurality of compressed gas storage volumes into the first receiving vessel, the second of the plurality of compressed gas storage volumes initially (i.e. at the time of initiating dispensing from the second compressed gas storage volume in this step) at a second pressure, $P_2$, where $P_{LOWER} < P_2 \leq P_{UPPER}$; and
(d) terminating dispensing from the second of the plurality of compressed gas storage volumes when the first receiving vessel is filled to a desired level for the first receiving vessel.

In one or more embodiments of the method, dispensing from the first of the plurality of compressed gas storage volumes may be terminated when the pressure in the first of the plurality of compressed gas storage volumes is within 5 MPa of $P_{LOWER}$ (or within 1 MPa of $P_{LOWER}$).

Since the pressure in the compressed gas storage volumes is maintained between $P_{LOWER}$ and $P_{UPPER}$ inclusive, the dispensing in step (b) may be terminated without regard to the pressure difference between the first compressed gas storage volume and the first receiving vessel and/or terminated without regard to the instantaneous flow rate of the compressed gas from the first compressed gas storage volume to the first receiving vessel.

During step (a), when compressed gas is being dispensed from the first compressed gas storage volume, compressed gas may be introduced into the first of the plurality of compressed gas storage volumes from a compressed gas source at the same time. Compressed gas may be introduced into the first compressed gas storage volume provided that the pressure in the first compressed gas storage volume is not increased at any time during the pressure decrease portion of the pressure cycle.

During step (a), when compressed gas is being dispensed from the first compressed gas storage volume, compressed gas may be introduced into the first receiving vessel from a compressor at the same time. Compressed gas may be introduced into the first receiving volume provided that the pressure in the first compressed gas storage volume is not increased at any time during the pressure decrease portion of the pressure cycle.

The dispensing system of FIG. 1 may be modified by adding line 43 that places the outlet of compressor 7 in fluid flow communication with dispensing line 29. Line 43 includes flow control valve 45 that is controlled by programmable logic controller 39. This embodiment is characterized by the feature that the gas receiving vessel in each gas dispensing cycle in a series of gas dispensing cycles receives gas from a respective gas storage volume while additional gas is provided to the storage volume and/or the gas receiving vessel from compressor 7 during at least a portion of the gas dispensing cycle.

During step (c), when compressed gas is being dispensed from the second compressed gas storage volume, compressed gas may be introduced into the second compressed gas storage volume from a compressed gas source at the same time. Compressed gas may be introduced into the second compressed gas storage volume provided that the pressure in the second compressed gas storage volume is not increased at any time during the pressure decrease portion of the pressure cycle for the second compressed gas storage volume.

During step (c), when compressed gas is being dispensed from the second compressed gas storage volume, compressed gas may be introduced into the first receiving vessel from a compressor at the same time. Compressed gas may be introduced into the receiving vessel provided that the pressure in the second compressed gas storage volume is not increased at any time during the pressure decrease portion of the pressure cycle for the second compressed gas storage volume.

Introducing compressed gas while the compressed gas storage volume is at the same time dispensing provides the benefit of expanding the throughput of compressed gas from the storage volume while not adding another count to the number of pressure cycles for the compressed gas storage volume.

Steps (a)-(d) are illustrated with reference to FIG. 2. Consider storage volume A as the first of the plurality of compressed gas storage volumes, storage volume B as the second of the plurality of compressed gas storage volumes, and receiving vessel A as the first receiving vessel. Consonant with step (a) storage volume A is initially at 90 MPa, a first pressure, $P_1$, where $P_{LOWER} < P_1 \leq P_{UPPER}$. In FIG. 2, $P_1 = P_{UPPER}$ for storage volume A dispensing to receiving vessel A.

Consonant with step (b), dispensing from storage volume A is terminated when the pressure in storage volume A is 63 MPa, that is, a pressure within 7.5 MPa of $P_{LOWER}$.

Consonant with step (c), subsequent to terminating dispensing from storage volume A, compressed gas is dispensed from storage volume B into the receiving vessel A, where storage volume B is initially at a pressure of 88 MPa, that is, a pressure greater than $P_{LOWER}$ and less than or equal to $P_{UPPER}$.

Consonant with step (d), dispensing from storage volume B is terminated when receiving vessel A is filled to 70 MPa, the desired level for receiving vessel A. The "desired level" may be based on any suitable criteria known in the art. For example, the desired level may be a desired pressure in the receiving vessel, or the desired level may be a desired density in the receiving vessel.

In step (c), the phrase "subsequent to step (b)" does not mean that dispensing from other storage volumes is not permitted prior to dispensing from the second of the plurality of compressed gas storage volumes.

Dispensing to receiving volume D in FIG. 2 illustrates an instance where three storage volumes dispense to one receiving vessel consonant with steps (a)-(d). Consider storage volume A as the first of the plurality of compressed gas storage volumes, storage volume C as the second of the plurality of compressed gas storage volumes, and receiving vessel D as the first receiving vessel. Consonant with step (a), storage volume A is initially at 70 MPa (point 255), that is, a pressure greater than $P_{LOWER}$ and less than or equal to $P_{UPPER}$. Consonant with step (b), dispensing from storage volume A is terminated when the pressure in storage volume A is 60 MPa (point 257), that is, a pressure within 7.5 MPa of $P_{LOWER}$. Consonant with step (c), subsequent to terminating dispensing storage volume A, compressed gas is dispensed from storage volume C into the receiving vessel D, where storage volume C is initially at a pressure of 85.5 MPa (point 271), that is, a pressure greater than $P_{LOWER}$ and less than or equal to $P_{UPPER}$. Consonant with step (d), dispensing from storage volume C is terminated when receiving vessel D is filled to 70 MPa, the desired level for receiving vessel D.

The method may include additional steps between steps (b) and (c). For example, the method may further comprise:
subsequent to step (b), dispensing from another of the plurality of compressed gas storage volumes into the first receiving vessel, the other of the plurality of compressed gas storage volumes initially having a pressure within 7.5 MPa of $P_{UPPER}$; and
terminating dispensing from the other of the plurality of compressed gas storage volumes when the pressure in the other compressed gas storage volume is within 7.5 MPa of $P_{LOWER}$.

In one or more embodiments of the method, dispensing from the other of the plurality of compressed gas storage volumes may initially have a pressure within 5 MPa of $P_{UPPER}$ or within 2 MPa of $P_{UPPER}$.

In one or more embodiments of the method, dispensing from the other of the plurality of compressed gas storage volumes may be terminated when the pressure in the other of the plurality of compressed gas storage volumes is within 5 MPa of $P_{LOWER}$ or within 1 MPa of $P_{LOWER}$.

For the instance of dispensing to receiving volume D, FIG. 2 shows storage volume B dispensing to receiving vessel D between the step of dispensing from storage volume A and the step of dispensing from storage volume C. Storage volume B is the other compressed gas storage volume dispensing into receiving vessel D and storage volume B initially has a pressure of 90 MPa (point 261), which is within 7.5 MPa of $P_{UPPER}$. Dispensing is terminated from storage volume B when the pressure in storage volume B is 65 MPa (point 263), that is, within 7.5 MPa of $P_{LOWER}$.

Upon terminating dispensing in step (d), the second compressed gas storage volume has a pressure $P_3$. The method may further comprise:
- (e) dispensing from the second of the plurality of compressed gas storage volumes into a second receiving vessel, the second of the plurality of compressed gas storage volumes initially (i.e. at the time of initiating dispensing in this step) at the pressure, $P_3$;
- (f) terminating dispensing from the second of the plurality of compressed gas storage volumes when the pressure in the second of the plurality of compressed gas storage volumes is within 7.5 MPa of $P_{LOWER}$;
- (g) subsequent to step (f), dispensing from a third of the plurality of compressed gas storage volumes into the second receiving vessel, the third of the plurality of compressed gas storage volumes initially (i.e. at the time of initiating dispensing in this step) at a fourth pressure, $P_4$, where $P_{LOWER} < P_4 \leq P_{UPPER}$; and
- (h) terminating dispensing from the third of the plurality of compressed gas storage volumes when the second receiving vessel is filled to a desired level for the second receiving vessel.

In one or more embodiments of the method, dispensing from the second of the plurality of compressed gas storage volumes may be terminated when the pressure in the second of the plurality of compressed gas storage volumes is within 5 MPa of $P_{LOWER}$ or within 1 MPa of $P_{LOWER}$.

Steps (e)-(h) are illustrated with reference to FIG. 2. Consider storage volume B as the second of the plurality of compressed gas storage volumes, storage volume C as the third of the plurality of compressed gas storage volumes, and receiving vessel B as the second receiving vessel.

Consonant with step (e), storage volume B is initially at 80 MPa (point 235), the third pressure, $P_3$, the same pressure in the second compressed gas storage volume upon terminating dispensing in step (d), (point 233).

Consonant with step (f), dispensing from storage volume B is terminated when the pressure in storage volume B is 60 MPa (point 237), that is, a pressure within 7.5 MPa of $P_{LOWER}$.

Consonant with step (g), subsequent to terminating dispensing from storage volume B, compressed gas is dispensed from storage volume C into the receiving vessel B, where storage volume C is initially at a pressure of 89 MPa (point 241), that is, a pressure (the fourth pressure, $P_4$) greater than $P_{LOWER}$ and less than or equal to $P_{UPPER}$.

Consonant with step (h), dispensing from storage volume C is terminated when receiving vessel B is filled to 70 MPa, the desired level for receiving vessel B. The desired level for receiving vessel B may be the same as the desired level for receiving A or it may be different than the desired level for receiving vessel A. Again, the "desired level" may be based on any suitable criteria known in the art.

In step (g), the phrase "subsequent to step (b)" does not mean that dispensing from other storage volumes is not permitted prior to dispensing from the second of the plurality of compressed gas storage volumes.

The method may comprise steps specific to a system using two compressed gas storage volumes. Upon terminating dispensing in step (d), the second compressed gas storage volume has a pressure $P_3$. The method may further comprise:
- (e) dispensing from the second of the plurality of compressed gas storage volumes into a second receiving vessel, the second of the plurality of compressed gas storage volumes initially (i.e. at the time of initiating dispensing in this step) at the pressure, $P_3$;
- (f) terminating dispensing from the second of the plurality of compressed gas storage volumes when the pressure in the second of the plurality of compressed gas storage volumes is within 7.5 MPa of $P_{LOWER}$;
- (g') subsequent to step (f), dispensing from the first of the plurality of compressed gas storage volumes into the second receiving vessel, the first of the plurality of compressed gas storage volumes initially (i.e. at the time of initiating dispensing in this step) within 7.5 MPa of $P_{UPPER}$; and
- (h') terminating dispensing from the first of the plurality of compressed gas storage volumes when the second receiving vessel is filled to a desired level for the second receiving vessel.

In one or more embodiments of the method, dispensing from the second of the plurality of compressed gas storage volumes may be terminated when the pressure in the second of the plurality of compressed gas storage volumes is within 5 MPa of $P_{LOWER}$ or within 1 MPa of $P_{LOWER}$.

The method may further comprise adding compressed gas to the first compressed gas storage volume after step (b) and before step (g') to increase the pressure in the first compressed gas storage volume from within 7.5 MPa of $P_{LOWER}$ to within 7.5 MPa of $P_{UPPER}$. In one or more embodiments of the method, the pressure in the first compressed gas storage volume may be increased from within 5 MPa of $P_{LOWER}$ to within 5 MPa of $P_{UPPER}$. In one or more embodiments of the method, the pressure in the first compressed gas storage volume may be increased from within 1 MPa of $P_{LOWER}$ to within 2 MPa of $P_{UPPER}$.

Figure 3:
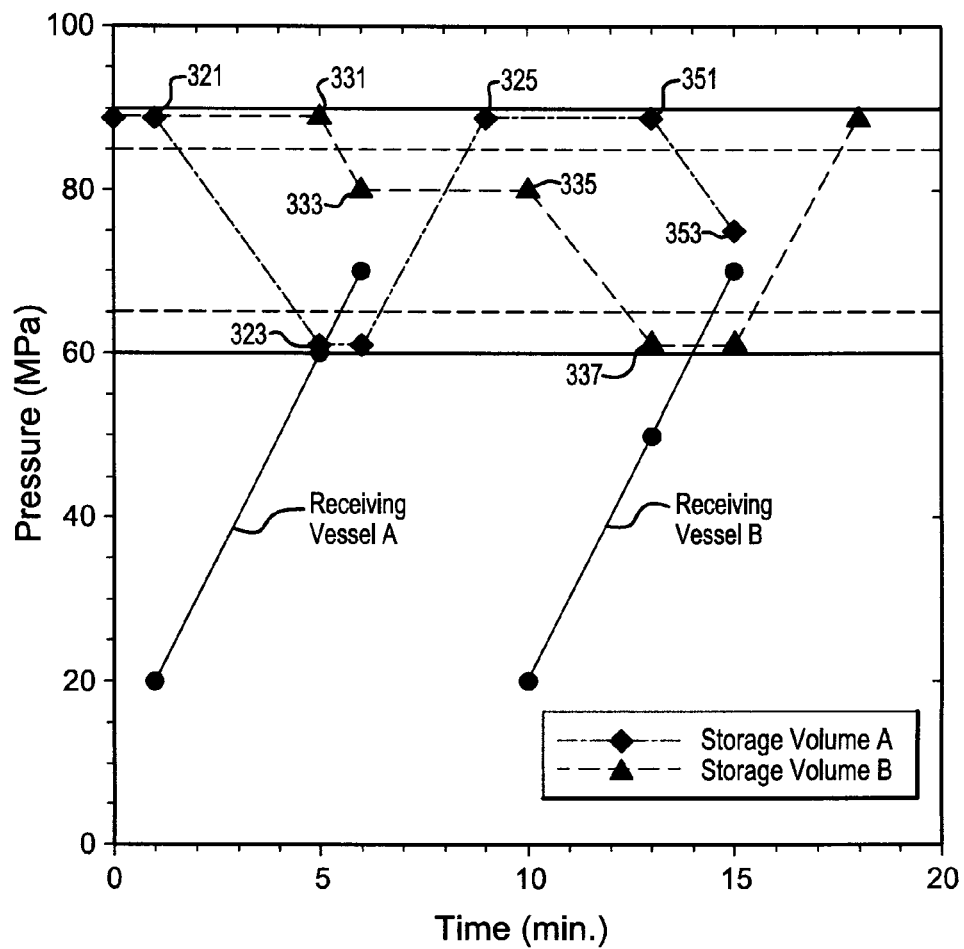
FIG. 3 is a generalized plot of pressure vs. elapsed time for a rolling rotating cascade dispensing process utilizing a compressed gas storage and dispensing system with two compressed gas storage volumes.

Steps (a)-(f), (g') and (h') are illustrated with reference to FIG. 3. Consider storage volume A as the first of the plurality of compressed gas storage volumes, storage volume B as the second of the plurality of compressed gas storage volumes, receiving vessel A as the first receiving vessel, and receiving vessel B as the second receiving vessel.

Consonant with step (a), storage volume A is initially at 89 MPa (point 321), a first pressure, $P_1$, where $P_{LOWER} < P_1 \leq P_{UPPER}$.

Consonant with step (b), dispensing from storage volume A is terminated when the pressure in storage volume A is 61 MPa (point 323), that is, a pressure within 7.5 MPa of $P_{LOWER}$.

Consonant with step (c), subsequent to terminating dispensing from storage volume A, compressed gas is dispensed from storage volume B into receiving vessel A, where storage volume B is initially at a pressure of 89 MPa (point 331), that is, a pressure greater than $P_{LOWER}$ and less than or equal to $P_{UPPER}$.

Consonant with step (d), dispensing from storage volume B is terminated when receiving vessel A is filled to 70 MPa, the desired level for receiving vessel A. The "desired level" may be based on any suitable criteria known in the art.

In step (c), the phrase "subsequent to step (b)" does not mean that dispensing from other storage volumes is not permitted prior to dispensing from the second of the plurality of compressed gas storage volumes.

Consonant with step (e), storage volume B is initially at 80 MPa (point 335), the third pressure, $P_3$, the same pressure in the second compressed gas storage volume upon terminating dispensing in step (d), (point 333).

Consonant with step (f), dispensing from storage volume B is terminated when the pressure in storage volume B is 61 MPa (point 337), that is, a pressure within 7.5 MPa of $P_{LOWER}$.

Consonant with step (g'), subsequent to terminating dispensing from storage volume B, compressed gas is dispensed from storage volume A into the receiving vessel B, where storage volume A is initially at a pressure of 89 MPa (point 351), that is, a pressure within 7.5 MPa of $P_{UPPER}$.

Consonant with step (h'), dispensing from storage volume A is terminated when receiving vessel B is filled to 70 MPa, the desired level for receiving vessel B. The desired level for receiving vessel B may be the same as the desired level for receiving vessel A or it may be different than the desired level for receiving vessel A. Again, the "desired level" may be based on any suitable criteria known in the art.

In step (g'), the phrase "subsequent to step (f)" does not mean that dispensing from other storage volumes is not permitted prior to dispensing from the first of the plurality of compressed gas storage volumes into the second receiving vessel.

The method described above is not meant to be limited by the specific parameters used in the illustration; numerous process variations are possible. For example, the time intervals between the steps in a dispensing cycle may vary and the elapsed time between successive dispensing cycles may differ in a random manner. The various pressure parameters also may vary. For example, the initial pressure in a gas receiving vessel may vary depending upon the gas utilization after a prior receiver fill. The upper and lower gas storage pressures, the intermediate dispensing pressures, and the upper dispensing pressure may be different than the examples to meet various specific process requirements. While the method as illustrated in FIG. 2 utilizes three gas storage volumes, as few as two storage volumes as illustrated in FIG. 3, and greater than three storage volumes could be used. Various fill rates may also be used, and the relative volume sizes may also be different.

Figure 4:
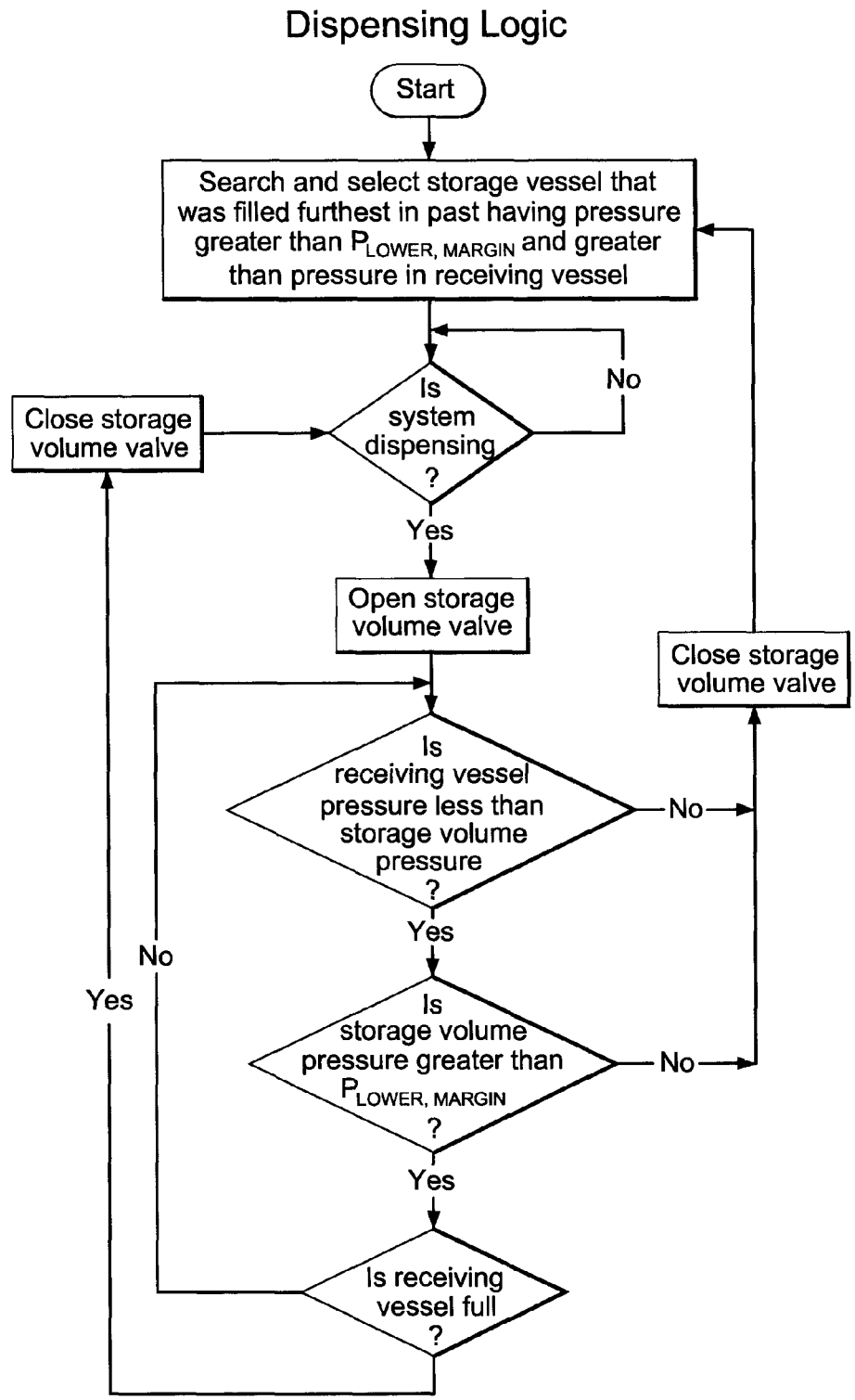
FIG. 4 is a process logic diagram for an exemplary dispensing portion of a process for compressed gas storage and dispensing system.

FIG. 4 illustrates an exemplary process logic diagram for the dispensing steps of the method from which suitable computer programs or PLC programs may be formulated.

After a receiving vessel is connected at connector 35, the dispensing portion of the system is started. The program searches for and selects the storage volume that was filled furthest in the past that has a pressure greater than $P_{LOWER}$ and also greater than the pressure in the connected receiving vessel. For purposes of illustration, referring to FIG. 1, storage volume A is the selected storage volume that was filled furthest in the past and has a pressure greater than $P_{LOWER}$ and also greater than the pressure in the connected receiving vessel.

The program continuously queries whether the system is dispensing. If no, nothing changes. If yes, the valve for the storage volume selected above opens (e.g. valve 17 opens).

The program then queries whether the pressure in the receiving vessel is less than the pressure in the storage volume from which compressed gas is being dispensed. If no, the valve for the storage volume in open fluid flow communication with the receiving vessel is closed (e.g. valve 17 closes). If yes, the program queries whether the pressure in the storage vessel is greater than or equal to $P_{LOWER}$. If no, the valve for the storage volume in open fluid flow communication with the receiving vessel is closed (e.g. valve 17 closes). If yes, the program queries whether the receiving vessel is filled to the desired level. If the receiving vessel is filled to the desired level, the valve for the storage volume closes (e.g. valve 17 closes) and the dispensing portion of the cycle stops.

If the receiving vessel is not filled to the desired level, the program goes back to search for and select another storage volume that was filled furthest in the past and that has a pressure greater than $P_{LOWER}$ and also greater than the pressure in the connected receiving vessel. The process continues as shown in the process logic diagram.

Contemporaneously with any dispensing or between dispensing to receiving vessels, a program executes for refilling the storage volumes.

Figure 5:
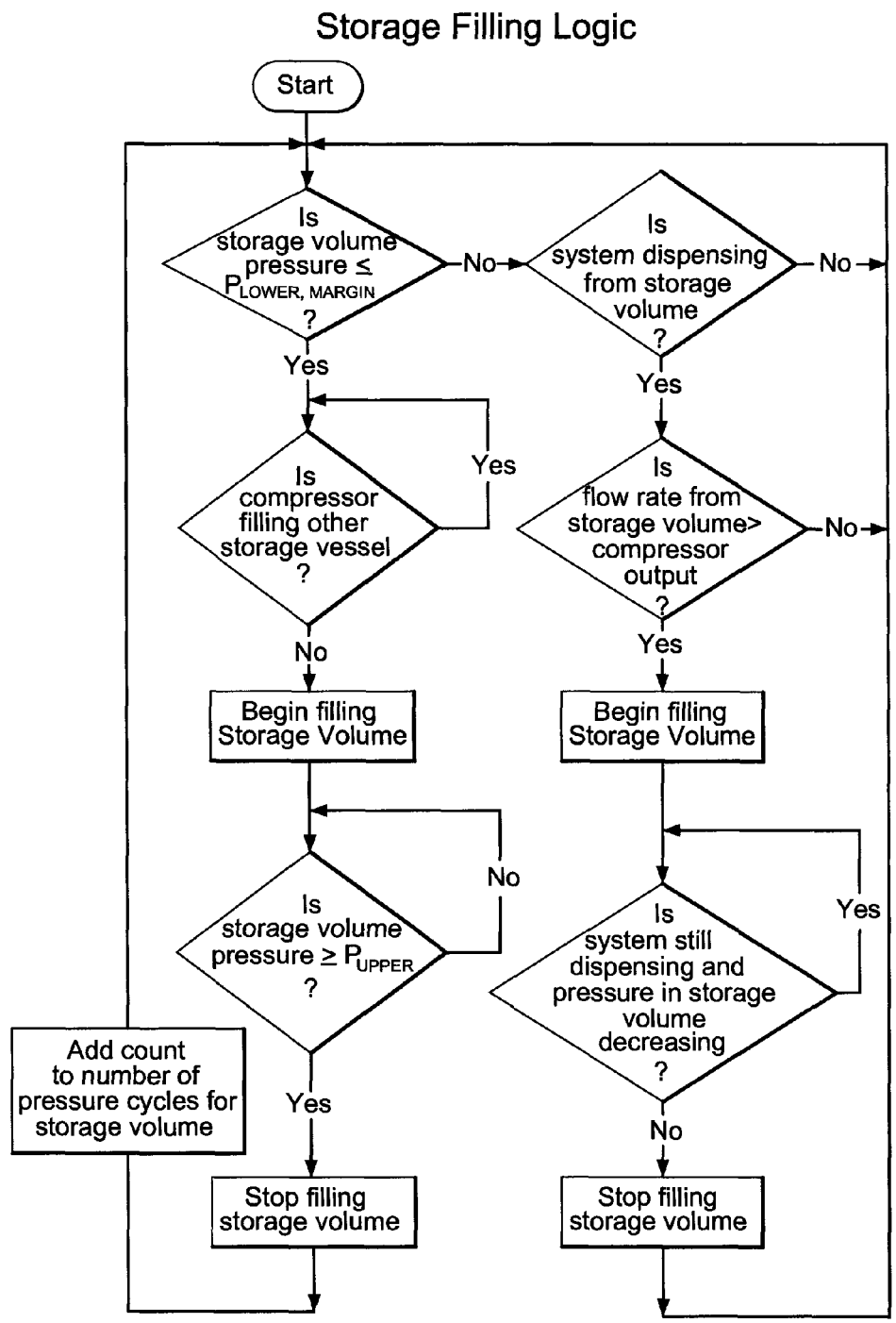
FIG. 5 is a process logic diagram for an exemplary storage filling portion of a process for compressed gas storage and dispensing system.

FIG. 5 illustrates an exemplary process logic diagram for the refilling steps of the method from which suitable computer programs or PLC programs may be formulated.

After the system is started, the program queries whether the pressure of a compressed gas storage volume is less than $P_{LOWER, MARGIN}$. If no, the program queries whether the system is dispensing compressed gas from the compressed gas storage volume. If no, the system waits until the pressure in the compressed gas storage volume is less than $P_{LOWER, MARGIN}$.

If the pressure in the compressed gas storage volume is less than $P_{LOWER, MARGIN}$, the system queries whether the compressor is being used to fill a different compressed gas storage volume. If the compressor is being used to fill another compressed gas storage volume, the instant compressed gas storage volume waits until the compressor is finished filling the other compressed gas storage volume. If the compressor is not being used to fill another compressed gas storage volume, the program initiates transfer of compressed gas via the compressor (7 in FIG. 1) from the compressed gas source (27 in FIG. 1, to the compressed gas storage volume.

The program then queries whether the compressed gas storage volume is filled to the desired level (e.g. $P_{UPPER, MARGIN}$). In case the pressure in compressed gas storage volume is less than $P_{UPPER, MARGIN}$, the compressed gas storage volume continues to receive compressed gas. In case the pressure in compressed gas storage volume is greater or equal to $P_{UPPER, MARGIN}$, filling of the compressed gas storage volume is terminated. The program goes back to the beginning to search for another compressed gas storage volume to fill.

When the system is dispensing compressed gas from a compressed gas storage volume, the program queries whether the flow rate from the compressed gas storage vessel is greater than the output of the compressor. If no, nothing happens. If yes, compressed gas is introduced into the compressed gas storage volume. This step ensures that the pressure in the compressed gas storage volume is not increased at any time during the pressure decrease portion of the pressure cycle.

The program queries whether the system is dispensing from the compressed gas storage volume and that the pressure in the compressed gas storage volume is decreasing. If yes, filling of the compressed gas storage volume via the compressor is continued. If no, filling of the compressed gas storage volume via the compressor is terminated and the program goes back to the beginning to search for another compressed gas storage volume to fill.

The process logic diagrams in FIG. 4 and FIG. 5 are exemplary. Various changes and modification can be made while still remaining within the scope of the present method as defined by the claims.

For example, when the system is not dispensing gas from a compressed gas storage volume, and the system has been idle for selected period, and the system does not have a sufficient quantity of compressed gas to fill a selected number of receiving vessels, and it is night-time, the program may fill the compressed gas storage volumes even though the pressure is not less than $P_{LOWER, MARGIN}$. Also, the system may include various override features.

The method may include providing one or more secondary control instructions. The secondary control instructions may be provided to introduce compressed gas into each of the plurality of compressed gas storage volumes until the pressure in each of the plurality of compressed gas storage volumes is within 7.5 MPa of $P_{UPPER}$ wherein the secondary control instructions are provided independent of the pressure in each of plurality of compressed gas storage volumes preceding this step of providing the control instructions to introduce compressed gas.

Secondary control instructions may be implemented with different rules on which compressed gas storage volumes to fill based on station capability improvement instead of minimizing cycle count. For example, at 2:00 a.m., the station may use secondary control instructions to completely refill all of the compressed gas storage volumes so that they start full when the station opens in the morning. This adds one cycle count per day, but that may be an acceptable compromise for better station operation.

Another situation when secondary control instructions may be implemented includes where a compressed gas storage volume is filled even though it is not within 7.5 MPa of $P_{LOWER}$ such as when there is not enough compressed gas left in any of the compressed gas storage volumes to complete another receiving vessel fill. For example, if the system has two high pressure supplies, and one is at 65 MPa, just above the refill point, and the second bank is at 72 MPa, neither bank is due for a refill by the primary control instructions. But if a customer were to arrive, they would not be able receive a complete fill, maybe only a maximum pressure of 70 MPa, which might result in a dissatisfied customer. A secondary control instruction may be implemented to refill compressed gas storage volumes "early" wasting a part of a cycle, but avoiding dissatisfied customers.

EXAMPLES

Example 1—Comparative Example

The dispensing system shown in FIG. 1 may be operated in a conventional rotating cascade dispensing process where gas is transferred sequentially from each of gas storage volumes A, B, and C into compressed gas receiving vessel R at increasing pressures wherein each gas storage volume operates within a given pressure range for each fill step. Gas storage volume A dispenses gas to compressed gas receiving vessel R from an initial pressure to a first intermediate pressure, storage volume B dispenses gas to the receiver from the first intermediate pressure to a second intermediate pressure, and storage volume C dispenses gas to the receiver from the second intermediate pressure to a final fill pressure. After dispensing is complete, compressed gas receiving vessel R, which may be a compressed gas storage tank in a vehicle, is disconnected from the dispensing system at coupling 35.

Subsequently, storage volumes are refilled by compressor 7 from gas source 27 to an upper gas storage pressure. In a subsequent dispensing step, another compressed gas receiving vessel R is connected at coupling 35, and gas is dispensed in the same manner as described immediately above. This is repeated on a regular basis in which the gas dispensing system provides compressed gas to a series of additional compressed gas receiving vessels. In this exemplary dispensing method, gas storage volume A always dispenses gas in a lower pressure range, gas storage volume B always dispenses gas in an intermediate pressure range, and the gas storage volume C always dispenses gas in a higher pressure range. Thus during a series of dispensing cycles the gas storage volumes always dispense in the rotating sequence ABC, ABC, etc.

During dispensing to each receiving vessel, each compressed gas storage volume receives another count towards the number pressure cycles accumulated.

Example 2—Comparative Example

An illustrative example of a non-cascade dispensing process is shown in Table 1 wherein gas storage volumes A, B, and C are initially filled to 41.5 MPa (6000 psig) and dispense gas in parallel to fill compressed gas receiving vessel R from an initial pressure of 7.0 MPa (1000 psig). Each gas storage volume has a representative volume of 2 m³ and compressed gas receiving vessel R has a representative volume of 5 m³; thus the volume of gas receiving vessel R is 2.5 times the volume of each gas storage volume. In this process, gas receiving vessel R is filled in a single step in which valves 17, 19, 21, and 31 are opened simultaneously and gas receiving vessel R is filled to a final pressure of 25.8 MPa (3727 psig) after pressure equalization between the storage volumes and the receiving vessel.

TABLE 1

Example of a Non-cascade Dispensing Process

|  | Initial Pressure, (MPa) | Final Pressure, (MPa) |
|---|---|---|
| Storage Volume A | 41.5 | 25.8 |
| Storage Volume B | 41.5 | 25.8 |
| Storage Volume C | 41.5 | 25.8 |
| Receiver R | 7.0 | 25.8 |

Example 3—Comparative Example

An illustrative example of a rotating cascade dispensing process is shown in Table 2 wherein gas storage volumes A, B, and C are initially filled to 41.5 MPa (6000 psig) and dispense gas to fill compressed gas receiving vessel R from an initial pressure of 7.0 MPa (1000 psig). Each gas storage volume has a representative volume of 2 m³ and compressed gas receiving vessel R has a representative volume of 5 m³ such that the volume of gas receiving vessel R is 2.5 times the volume of each gas storage volume. In this process, gas receiving vessel R is filled in a series of steps in which each of valves 17, 19, and 21 is opened and closed sequentially while valve 31 remains open. In a first step, valve 17 is opened, gas flows from storage volume A into gas receiving vessel R until the pressure equalizes between the storage volume and receiver at a first intermediate pressure of 16.8 (2430 psig), and valve 17 is closed. In a second step, valve 19 is opened, gas flows from storage volume B into gas receiving vessel R until the pressure equalizes at a second intermediate pressure of 23.9 MPa (3450 psig), and valve 19 is closed. In a third step, valve 21 is opened, gas flows from storage volume C into gas receiving vessel R until the pressure equalizes at a final fill pressure of 28.9 MPa (4180 psig), and valve 21 is closed.

TABLE 2

Example of a Rotating Cascade Dispensing Process

|  | Initial Pressure (MPa) | Pressure after first step (MPa) | Pressure after second step (MPa) | Final Pressure (MPa) |
|---|---|---|---|---|
| Storage Volume A | 41.5 | 16.8 | 16.8 | 16.8 |
| Storage Volume B | 41.5 | 41.5 | 23.9 | 23.9 |
| Storage Volume C | 41.5 | 41.5 | 41.5 | 28.9 |
| Receiver R | 7.0 | 16.8 | 23.9 | 28.9 |

A comparison of the non-cascade process of Table 1 and the rotating cascade process of Table 2 illustrates the benefit of a cascade dispensing process wherein a higher final fill pressure in gas receiving vessel R can be obtained in the cascade process with given volumes of the receiving vessel and storage volumes and with given initial pressures in the storage volumes and receiving vessel. This benefit is well-known in the art of compressed gas dispensing.

Example 4—Comparative Example

Figure 6:
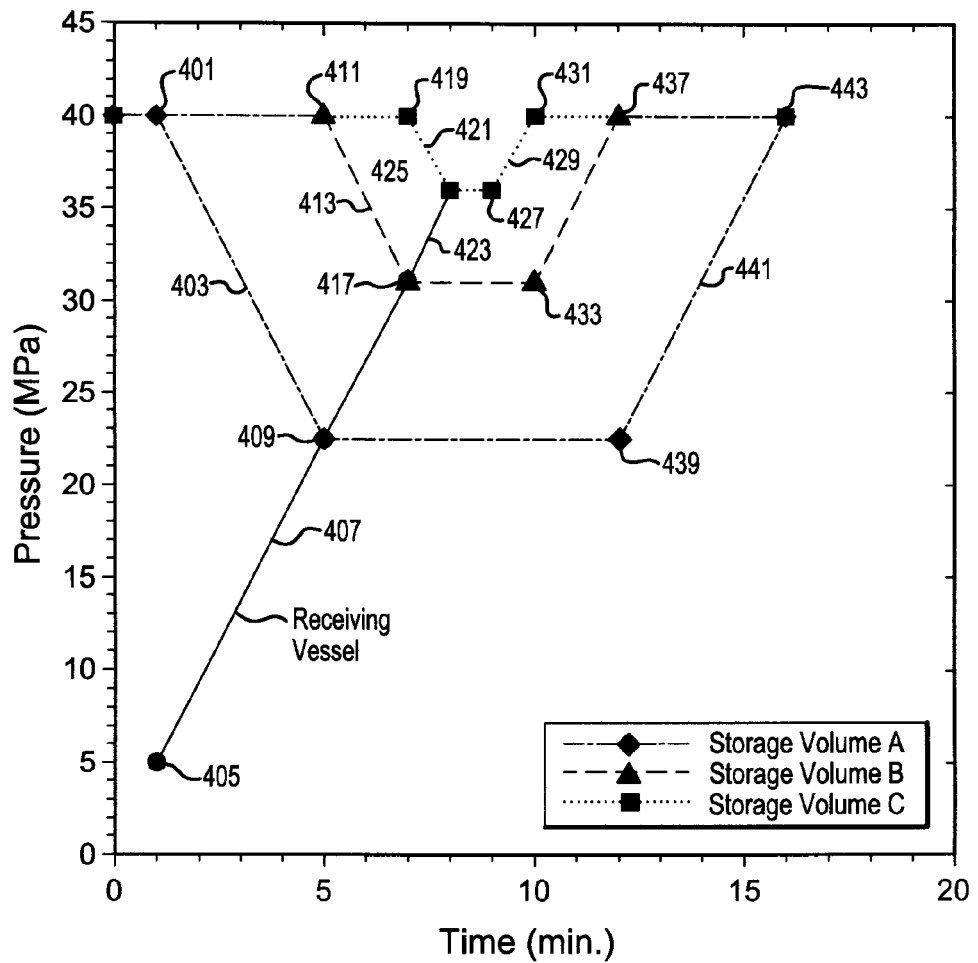
FIG. 6 is a plot of pressure vs. elapsed time for a prior art rotating cascade dispensing process with refill.

An exemplary pressure-elapsed time profile for a rotating cascade dispensing process known in the art is given in FIG. 6. In this process, gas storage volumes A, B, and C are initially filled to a pressure of 40 MPa and compressed gas receiving vessel R is initially at a pressure of 5 MPa. Gas storage volumes A, B, and C and compressed gas receiving vessel R all have the same volumes in this example. Valve 31 (FIG. 1) is opened and the first fill step begins at an elapsed time of 1 minute by opening valve 17.

The pressure in gas storage volume A decreases from the initial pressure at point 401 along path 403 while the pressure in receiving vessel R increases from the initial pressure at point 405 along path 407, and the pressures equalize at a first intermediate pressure of 22.5 MPa at an elapsed time of 5 minutes at point 409. Valve 17 is closed while valve 31 remains open.

Valve 19 is then opened to begin the second fill step. The pressure in gas storage volume B decreases from the initial pressure at point 411 along path 413 while the pressure in receiver R increases along path 415, and the pressures equalize at a second intermediate pressure of 31.25 MPa at an elapsed time of 7 minutes at point 417. Valve 17 is closed while valve 31 remains open.

Valve 21 is then opened to begin the final fill step. The pressure in gas storage volume C decreases from the initial pressure at point 419 along path 421 while the pressure in receiving vessel R increases along path 423, and the pressures equalize at a final fill pressure of 35.625 MPa at an elapsed time of 8 minutes at point 425. Valve 21 is closed and valve 31 is closed to terminate the final fill step. Receiving vessel R may be disconnected at coupling 35 at any elapsed time after the final fill step is complete.

Gas storage volume C is refilled from point 427 beginning at 9 minutes along path 429 by opening valve 11 and starting compressor 7, thereby refilling storage volume C from gas source 27. This refill step is terminated at point 431 by closing valve 11 at 10 minutes and a pressure of 40 MPa. Gas storage volume B is refilled from point 433 beginning at 10 minutes along path 435 by opening valve 13 while compressor 7 continues to operate, thereby refilling storage volume B from gas source 27. This refill step is terminated at point 437 by closing valve 13 at 12 minutes and a pressure of 40 MPa. Gas storage volume A is refilled from point 439 beginning at 12 minutes along path 441 by opening valve 15 while compressor 7 continues to operate, thereby refilling storage volume A from gas source 27. This refill step is terminated at point 443 by closing valve 15 at 16 minutes and a pressure of 40 MPa. After refilling, the system is ready to dispense gas to another gas receiving vessel connected at coupling 35.

In the example described above with reference to FIG. 6, the plotted profiles of pressure vs. elapsed time are shown as being linear, which is a simplification for illustration purposes. In actual operations, these profiles may be non-linear; also, the profiles may be discontinuous, as there may be one or more interruptions during a dispensing cycle for hose checks as required by the National Fire Protection Association (NFPA).

In the gas dispensing cycle of this example, the pressures at the end of each dispensing step substantially equalize between each respective gas storage volume and the gas receiving vessel before switching the dispensing to another gas storage volume. Other criteria for switching the dispensing from one gas storage volume to another gas storage volume are possible. For example, switching can begin when the pressure differential between the gas storage volume and the gas receiving vessel reaches a predetermined value. In another example, switching can begin when the gas flow rate between the gas storage volume and the gas receiving vessel reaches a predetermined value.

In the exemplary rotating cascade gas dispensing cycle described above with reference to FIG. 6, gas storage volume A always dispenses gas in a pressure range between the upper storage pressure (e.g., 40 MPa) and a lower dispensing pressure (e.g., 22.5 MPa); gas storage volume B always dispenses gas in a pressure range between the upper storage pressure and an intermediate dispensing pressure (e.g., 31.25 MPa); and gas is always dispensed from gas storage volume C in a pressure range between the upper storage pressure and a final dispensing pressure (e.g., 35.625 MPa). Thus the pressure in each of the three storage volumes cycles is between the respective dispensing pressure and the upper storage pressure during every dispensing cycle, and every gas dispensing cycle requires the pressurization and depressurization of each of the three gas storage vessels. During dispensing to each receiving vessel, each compressed gas storage volume receives another count towards the number pressure cycles accumulated.

Example 5

The present method may be described as a rolling rotating cascade dispensing sequence with refill and is illustrated below with reference to FIG. 1 and FIG. 7, which shows a pressure vs. elapsed time profile for three gas storage volumes and four gas receiving vessels over a series of four gas dispensing cycles. Gas storage volumes A, B, and C and compressed gas receiving vessel R all have the same volumes in this example.

Figure 7:
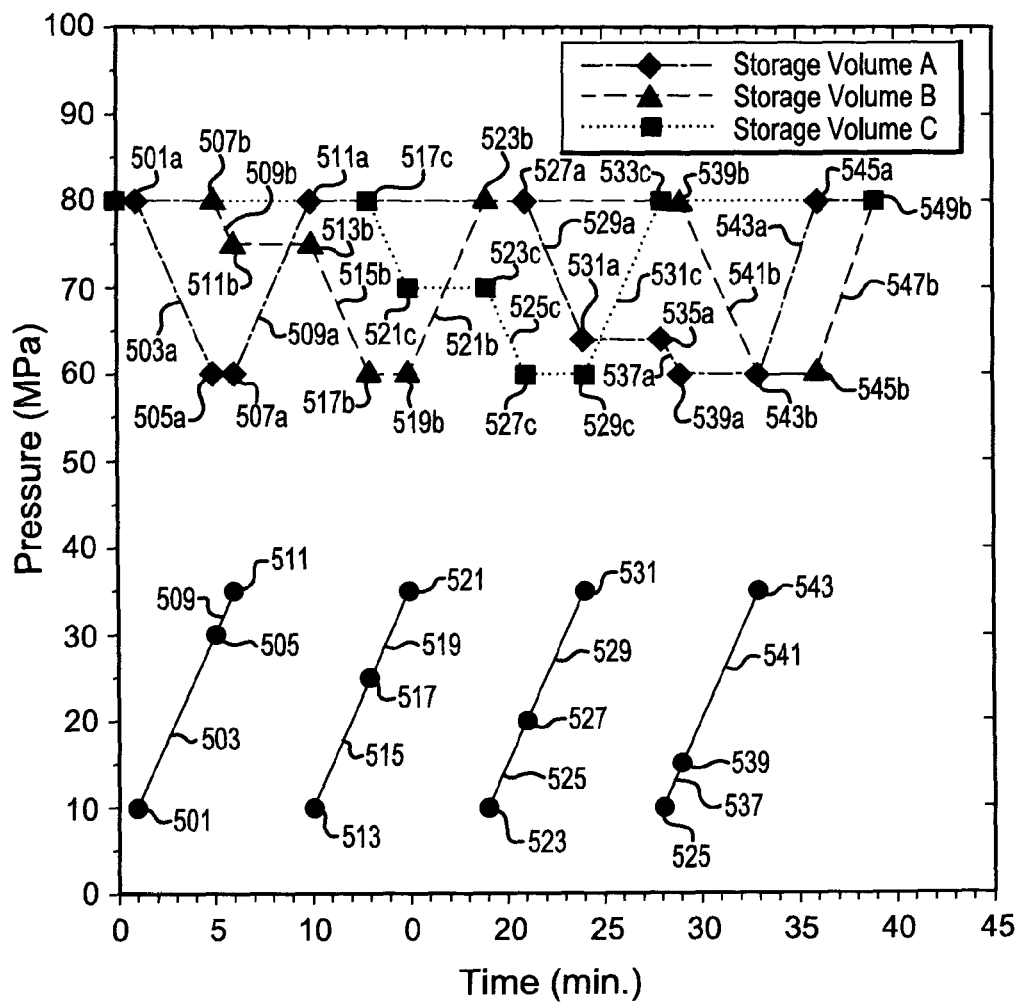
FIG. 7 is a plot of pressure vs. elapsed time for a rolling rotating cascade dispensing process with refill and compression utilizing the compressed gas storage and dispensing system of FIG. 1.

The series of gas dispensing cycles of FIG. 7 begins with each gas storage volume containing compressed gas at an upper gas storage pressure, which in this illustration is 80 MPa. Each gas receiving vessel is at an initial pressure, which in this illustration is 10 MPa, and is filled during the dispensing cycles to an upper dispensing pressure, which in this illustration is 35 MPa. All valves are initially closed.

A first gas receiving vessel R is connected to the dispensing system at coupling 35 and valve 31 is opened. The first of the series of dispensing cycles in FIG. 7 begins at an elapsed time of 1 minute wherein the pressure in storage volume A is 80 MPa at point 501a and the pressure in the first gas receiving vessel is 10 MPa at point 501. Valve 17 is opened and gas flows from storage volume A while the pressure decreases along path 503a, terminating at 5 minutes and a pressure of 60 MPa at point 505a. The lower gas storage pressure in this illustration is 60 MPa, and this may be considered as a first intermediate gas storage pressure. During this period, gas flows through manifold 23 and line 29 into the first gas receiving vessel R while the pressure therein increases along path 503, terminating at point 505 at 5 minutes and a pressure of 30 MPa. Valve 17 is closed.

Next, valve 19 is opened and gas flow from storage volume B begins at 80 MPa at 5 minutes at point 507b; gas flows from storage volume B while the pressure therein decreases along path 509*b*, terminating at point 511 b at 6 minutes and a second intermediate pressure of 75 MPa. During this period, gas flows through manifold 23 and line 29 into the first gas receiving vessel R while the pressure therein increases along path 509, terminating at point 511 at 6 minutes and a pressure of 35 MPa. Valve 19 is closed. The first gas receiving vessel R is now full and may be disconnected at coupling 35. Storage volume A is refilled beginning at point 507*a* at 6 minutes by opening valve 11 and starting compressor 7 to compress and transfer gas from source 27. As refill proceeds, the pressure in storage volume A increases along path 509*a* and terminates at the upper gas storage pressure of 80 MPa at point 511 a at 9 minutes. Valve 11 is closed and compressor 7 is stopped.

A second gas receiving vessel R, initially at a pressure of 10 MPa, is connected to the dispensing system at coupling 35. Next, valve 19 is opened and gas flow from storage volume B begins at 75 MPa at 10 minutes at point 513*b*; gas flows from storage volume B while the pressure therein decreases along path 515*b*, terminating at point 517*b* at 6 minutes and a lower gas storage pressure of 60 MPa. During this period, gas flows through manifold 23 and line 29 into the second gas receiving vessel R while the pressure therein increases from point 513 along path 515, terminating at point 517 at 13 minutes and a second intermediate gas storage pressure of 25 MPa. Valve 19 is closed.

Next, valve 21 is opened and gas flow from gas storage volume C begins at 13 minutes and 80 MPa at point 517*c*; gas flows from storage volume C while the pressure therein decreases along path 51*c*, terminating at point 521*c* at 15 minutes and a second intermediate pressure of 70 MPa. During this period, gas flows through manifold 23 and line 29 into the second gas receiving vessel R while the pressure therein increases along path 319, terminating at point 521 at 15 minutes and a pressure of 35 MPa. Valve 21 is closed. The second gas receiving vessel R is now full and may be disconnected at coupling 35. Storage volume B is refilled beginning at point 519*b* at 15 minutes by opening valve 13 and starting compressor 7 to compress and transfer gas from source 27. As refill proceeds, the pressure in storage volume B increases along path 521*b* and terminates at the upper storage pressure of 80 MPa at point 523*b* at 18 minutes. Valve 11 is closed and compressor 7 is stopped.

A third gas receiving vessel R, initially at a pressure of 10 MPa, is connected to the dispensing system at coupling 35. Valve 21 is opened and gas flow from storage volume C begins at 70 MPa at 18 minutes at point 523*c*; gas flows from storage volume C while the pressure therein decreases along path 525*c*, terminating at point 527*c* at 21 minutes and a lower gas storage pressure of 60 MPa. During this period, gas flows through manifold 23 and line 29 into the third gas receiving vessel R while the pressure therein increases from point 523 along path 525, terminating at point 527 at 21 minutes and a third intermediate gas storage pressure of 20 MPa. Valve 21 is closed.

Next, valve 17 is opened and gas flow from gas storage volume A begins at 21 minutes and 80 MPa at point 527*a*; gas flows from storage volume A while the pressure therein decreases along path 529*a*, terminating at point 531*a* at 24 minutes and a second intermediate pressure of 65 MPa. During this period, gas flows through manifold 23 and line 29 into the third gas receiving vessel R while the pressure therein increases along path 529, terminating at point 531 at 24 minutes and a pressure of 35 MPa. Valve 17 is closed. The third gas receiving vessel R is now full and may be disconnected at coupling 35. Storage volume C is refilled beginning at point 529*c* at 24 minutes by opening valve 15 and starting compressor 7 to compress and transfer gas from source 27. As refill proceeds, the pressure in storage volume C increases along path 531*c* and terminates at the upper storage pressure of 80 MPa at point 533*c* at 27 minutes. Valve 15 is closed and compressor 7 is stopped.

A fourth gas receiving vessel R, initially at a pressure of 10 MPa, is connected to the dispensing system at coupling 35. Valve 17 is opened and gas flow from storage volume A begins at 65 MPa at 28 minutes at point 535*a*; gas flows from storage volume A while the pressure therein decreases along path 537*a*, terminating at point 539*a* at 29 minutes and a lower gas storage pressure of 60 MPa. During this period, gas flows through manifold 23 and line 29 into the fourth gas receiving vessel R while the pressure therein increases from point 535 along path 537, terminating at point 539 at 29 minutes and a fourth intermediate gas storage pressure of 15 MPa. Valve 17 is closed.

Next, valve 19 is opened and gas flow from gas storage volume B begins at 29 minutes and 80 MPa at point 527*a*; gas flows from storage volume B while the pressure therein decreases along path 541*b*, terminating at point 543*b* at 33 minutes and the lower gas storage pressure in this illustration of 60 MPa, which may be considered as a fifth intermediate gas storage pressure of 60 MPa. During this period, gas flows through manifold 23 and line 29 into the fourth gas receiving vessel R while the pressure therein increases along path 341, terminating at point 531 at 33 minutes and a pressure of 35 MPa. Valve 19 is closed. The fourth gas receiving vessel R is now full and may be disconnected at coupling 35. Storage volume A is refilled beginning at point 543*b* at 33 minutes by opening valve 11 and starting compressor 7 to compress and transfer gas from source 27. As refill proceeds, the pressure in storage volume A increases along path 543*a* and terminates at the upper storage pressure of 80 MPa at point 545*a* at 36 minutes.

Valve 11 is closed, and valve 13 is opened while compressor 7 continues to run. Storage volume B is refilled beginning at point 545*b* at 36 minutes while compressor 7 compresses and transfers gas from source 27. As refill proceeds, the pressure in storage volume B increases along path 547*b* and terminates at the upper gas storage pressure of 80 MPa at point 549*b* at 39 minutes. At this point, the dispensing system is ready for another series of dispensing cycles similar to those described above.

The example described above illustrates where three gas storage volumes are utilized to fill a succession of gas receiving vessels in a series of dispensing cycles in which each receiver is filled with gas from two different respective gas storage volumes. In each dispensing cycle, filling is switched from one gas storage volume to another gas storage volume at an intermediate pressure between the initial and final pressures in the gas receiving vessel.

Example 5 illustrates a benefit of the present method where five pressure cycles are required for filling four receiving vessels. This is a significant improvement compared with the prior art method described above with reference to FIG. 4, where three pressure cycles are required each time a receiving vessel is filled. The compressed gas storage volumes experiences approximately 3 times fewer pressure cycles in Example 5 using the present method compared to the method described in FIG. 4.

In the series of rolling rotating cascade dispensing cycles with refill described above, the gas storage volumes dispense in the rolling rotating cascade sequence AB, BC, CA, AB, BC, etc. This differs from the prior art rotating cascade described earlier in which the rotating sequence is ABC, ABC, ABC, etc, In the example described above with reference to FIG. 7, the plotted profiles of pressure vs. elapsed time are shown as being linear, which is a simplification for illustration purposes. In actual operations, these profiles may be non-linear; also, the profiles may be discontinuous, as there may be one or more interruptions during a dispensing cycle for hose checks as required by the National Fire Protection Association (NFPA).

Example 6

As mentioned above, the maximum number of operating cycles in the vessels of a gas dispensing system may be restricted for certain types of vessel design and fabrication materials in order to eliminate the possibility of vessel failure. For example, the number of pressurization-depressurization cycles in vessels fabricated of composite materials may be limited by the Pressure Vessel Code of the American Society of Mechanical Engineers (ASME), and this code may be applied by state or local regulating agencies in granting operating permits for these vessels. The present method and its various embodiments are useful in reducing the number of pressurization-depressurization cycles in successive dispensing steps as described in the prior art.

An example of a pressure vessel having a maximum allowable number of pressurization-depressurization cycles is described below. This vessel is installed as part of a hydrogen dispensing system and may be operated in dispensing cycles according to the method described above.

A composite pressure vessel is provided for the storage of hydrogen wherein the vessel is a cylindrical, horizontal seamless vessel 0.337 m (14.5 ft.) long with a diameter of 44.5 cm (17.5 in) and a volume of 0.343 m$^3$ (12.11 ft$^3$). The vessel is fabricated according to ASME section VIII Div. 3, 2007 edition, 2009 Addenda, and ASME Section X as applicable. The vessel is made of 4147 steel per SA 372 Grade J Class 70 with spun heads and carbon fiber plastic laminate wrap. One head has a neck and flange for gas filling and withdrawal; the heads are not wrapped. The design pressure is 103.5 MPa (15,000 psig), and the vessel is installed outdoors above ground with a design ambient temperature range of −40° C. to 66° C. (−40° F. to 150° F.).

The certified operating conditions according to the ASME code listed above are as follows:
  (a) maximum allowable working pressure: 103.5 MPa (15,000 psig)
  (b) nominal operating temperature: 21° C. (70° F.)
  (c) cyclic operating data:
    (1) 37,540 maximum lifetime fill cycles between 61.45 MPa (8,900 psig) and 93.15 MPa (13,500 psig)
    (2) maximum life of 20 years
    (3) 5% of the maximum lifetime fill cycles at operations below −1° C. (30° F.)
    (4) 5% of the maximum lifetime fill cycles at operations above 43° C. (110° F.)
    (5) 90% of the maximum lifetime fill cycles at operations at ambient temperature
    (6) One temperature cycle per day of 50° C. (90° F.) delta in the range of −40° C. (−40° F.) to 66° C. (150° F.) over the 20 year lifetime
    (7) Maximum of 40 cycles from 93.2 MPa (13,500 psig) to 0.101 MPa (0 psig)

A pressurization cycle as used above is defined as the pressurization of a vessel from a lower to an upper pressure in one step or a succession of steps with no intervening depressurization steps. The number of depressurization steps between pressurization steps is not limited.

In order to maximize the number of gas dispensing cycles within this maximum allowable number of pressurization cycles, the present method with its various embodiments described above may be utilized to minimize the number of cycles used for a given number of dispensing cycles.

When the rolling rotating cascade dispensing sequence with refill as described above with reference to FIG. 7 is utilized for hydrogen dispensing, it is seen that five pressurization steps are required for every four gas dispensing cycles. In FIG. 7, the five pressurization steps of the gas storage volumes are defined by the pressure profile paths 509a, 521b, 531c, 543a, and 547b, and the four dispensing cycles are defined by the pressure profile paths 503+509, 515+519, 525+529, and 537+541 in the receiving vessels.

When the rotating cascade cycle of the prior art as described earlier with reference to FIG. 6 is utilized for hydrogen dispensing, it is seen that three pressurization steps are required for every gas dispensing cycle. In FIG. 6, the three pressurization steps of the gas storage volumes are defined by the pressure profile paths 429, 435, and 441 and the dispensing cycle is defined by the pressure profile path 407+415+423 in the receiving vessel.

This Example illustrates that the rolling rotating cascade dispensing cycles according to the present method offers significant improvements over the prior art cascade dispensing cycle for use in a gas dispensing system having pressure vessels with a maximum allowable number of pressurization cycles.

The gas dispensing cycles according to aspects of the invention also may be used if desired in the operation of gas dispensing systems that have no limitations on the number of vessel pressurization cycles.

The dispensing system of FIG. 1 may be used to log the number of pressurization cycles when gas storage volumes A, B, and C include composite vessels and the system is operated according to the present method. Programmable logic controller 39 may be programmed to recognize and log the number of specific types of cycles described above using ambient temperature information provided by temperature measurement element 41. The controller also may provide a regular output of the system status regarding the number of pressurization cycles that have occurred in each of the respective temperature ranges and to issue a warning when these numbers approach the allowable maximum values. The controller also may be programmed to prevent subsequent filling storage filling steps if the maximum number of cycles has been reached. Cycle information logged by programmable logic controller 39 may be transmitted to off-site operators by known transmission methods such as phone lines, Internet connections, or wireless modems.

In the cyclic operation of gas storage vessels over an extended period of elapsed time, each vessel is subjected to a large number of pressurization-depressurization cycles, and thus the walls and heads of the vessels are subjected to cyclic stresses over this extended period of elapsed time. For certain types of vessel design and fabrication materials, the maximum number of operating cycles may be restricted in order to eliminate the possibility of vessel failure. For example, the number of pressurization-depressurization cycles in vessels fabricated of composite materials may be limited by the Pressure Vessel Code of the American Society of Mechanical Engineers (ASME), and this code may be applied by state or local regulating agencies in granting operating permits for these vessels.

In view of potential restrictions in the upper allowable number of pressurization-depressurization cycles for gas storage vessels, it is desirable to design and operate gas dispensing systems so that the number of pressurization-depressurization cycles for each storage vessel is minimized for each dispensing cycle in order to maximize the operating life of the vessels. In the examples described above according to the prior art for operating a gas dispensing system with three gas storage volumes, it is seen that each of the three storage volumes cycle between the respective dispensing pressure and the upper storage pressure during every dispensing cycle, and every gas dispensing cycle requires the pressurization and depressurization of each of the three gas storage vessels.

The present method described herein offers improved dispensing cycles in which the number of pressurization-depressurization cycles for the gas storage vessels is reduced, thereby maximizing the operating life of vessels with restrictions on the upper number of operating cycles.

The invention claimed is:

1. A method for dispensing a compressed gas from a plurality of more than two compressed gas storage volumes, wherein the plurality of compressed gas storage volumes are operated each in a pressure range ranging from a lower gas storage pressure, $P_{LOWER}$, to an upper gas storage pressure, $P_{UPPER}$, inclusive, the method comprising:
   (a) dispensing from a first of the plurality of compressed gas storage volumes into a first receiving vessel, the first of the plurality of compressed gas storage volumes initially at a first pressure, $P_1$, where $P_{LOWER} < P_1 \leq P_{UPPER}$;
   (b) terminating dispensing from the first of the plurality of compressed gas storage volumes when the pressure in the first of the plurality of compressed gas storage volumes is within 7.5 MPa of $P_{LOWER}$ wherein the dispensing is terminated without regard to the pressure difference between the first compressed gas storage volume and the first receiving vessel;
   (c) subsequent to step (b), dispensing from a second of the plurality of compressed gas storage volumes into the first receiving vessel, the second of the plurality of compressed gas storage volumes initially at a second pressure, $P_2$, where $P_{LOWER} < P_2 \leq P_{UPPER}$;
   (d) terminating dispensing from the second of the plurality of compressed gas storage volumes when the first receiving vessel is filled to a desired level for the first receiving vessel; and
   introducing compressed gas into the first of the plurality of compressed gas storage volumes at least until the pressure in the first of the plurality of compressed gas storage volumes is within 7.5 MPa of $P_{UPPER}$;
   whereby the pressure in each of the plurality of compressed gas storage volumes is cycled through pressure cycles during which compressed gas is withdrawn from each of the plurality of compressed gas storage volumes and compressed gas is introduced into each of the plurality of compressed gas storage volumes, the pressure cycles for each of the plurality of compressed gas storage volumes independent from one another, the pressure cycles for each of the plurality of compressed gas storage volumes having a pressure decrease portion and a pressure increase portion subsequent to the pressure decrease portion, wherein the pressure during the pressure decrease portion progresses from within 7.5 MPa of $P_{UPPER}$ to within 7.5 MPa of $P_{LOWER}$ and the pressure increase portion progresses from within 7.5 MPa of $P_{LOWER}$ to within 7.5 MPa of $P_{UPPER}$, wherein the pressure in each of the compressed gas storage volumes is not increased at any time during the pressure decrease portion of the pressure cycles and the pressure in each of the compressed gas storage volumes is not decreased at any time during the pressure increase portion of the pressure cycles.

2. The method of claim 1 wherein the pressure during the pressure decrease portion progresses from within 5 MPa of $P_{UPPER}$ to within 5 MPa of $P_{LOWER}$ and the pressure increase portion progresses from within 5 MPa of $P_{LOWER}$ to within 5 MPa of $P_{UPPER}$.

3. The method of claim 1 wherein the dispensing is terminated in step (b) without regard to the flow rate of the compressed gas from the first compressed gas storage volume to the first receiving vessel.

4. The method of claim 1 further comprising:
   subsequent to step (b), dispensing from another of the plurality of compressed gas storage volumes into the first receiving vessel, the other of the plurality of compressed gas storage volumes initially having a pressure within 7.5 MPa of $P_{UPPER}$; and terminating dispensing from the other of the plurality of compressed gas storage volumes when the pressure in the other compressed gas storage volume is within 7.5 MPa of $P_{LOWER}$.

5. The method of claim 1 wherein the second of the plurality of compressed gas storage volumes has a pressure $P_3$ upon terminating dispensing in step (d), the method further comprising:
   (e) dispensing from the second of the plurality of compressed gas storage volumes into a second receiving vessel, the second of the plurality of compressed gas storage volumes initially at the pressure, $P_3$;
   (f) terminating dispensing from the second of the plurality of compressed gas storage volumes when the pressure in the second of the plurality of compressed gas storage volumes is within 7.5 MPa of $P_{LOWER}$;
   (g) subsequent to step (f), dispensing from a third of the plurality of compressed gas storage volumes into the second receiving vessel, the third of the plurality of compressed gas storage volumes initially at a fourth pressure, $P_4$, where $P_{LOWER} < P_4 \leq P_{UPPER}$; and
   (h) terminating dispensing from the third of the plurality of compressed gas storage volumes when the second receiving vessel is filled to a desired level for the second receiving vessel.

6. The method of claim 1 wherein the second of the plurality of compressed gas storage volumes has a pressure $P_3$ upon terminating dispensing in step (d), the method further comprising:
   (e) dispensing from the second of the plurality of compressed gas storage volumes into a second receiving vessel, the second of the plurality of compressed gas storage volumes initially at the pressure, $P_3$;
   (f) terminating dispensing from the second of the plurality of compressed gas storage volumes when the pressure in the second of the plurality of compressed gas storage volumes is within 7.5 MPa of $P_{LOWER}$;
   (g') subsequent to step (f), dispensing from the first of the plurality of compressed gas storage volumes into the second receiving vessel, the first of the plurality of compressed gas storage volumes initially within 7.5 MPa of $P_{UPPER}$; and
   (h') terminating dispensing from the first of the plurality of compressed gas storage volumes when the second receiving vessel is filled to a desired level for the second receiving vessel.

7. The method of claim 6 wherein additional compressed gas is added to the first of the plurality of compressed gas storage volumes after step (b) and before step (g') to increase the pressure in the first of the plurality of compressed gas storage volumes from within 7.5 MPa of $P_{LOWER}$ to within 7.5 MPa of $P_{UPPER}$.

8. The method of claim 1 wherein during step (a), compressed gas is introduced into the first of the plurality of compressed gas storage volumes from a compressed gas source.

9. The method of claim 1 wherein during step (c), compressed gas is introduced into the second of the plurality of compressed gas storage volumes from a compressed gas source.

10. The method of claim 1 wherein during step (a), compressed gas is also introduced into the first receiving vessel from a compressor.

11. The method of claim 1 wherein during step (c), compressed gas is introduced into the first receiving vessel from a compressor.

12. A method for dispensing a compressed gas from a plurality of more than two compressed gas storage volumes, wherein the plurality of compressed gas storage volumes are operated each in a pressure range ranging from a lower gas storage pressure, $P_{LOWER}$, to an upper gas storage pressure, $P_{UPPER}$, inclusive, the method comprising:
(a) dispensing from a first of the plurality of compressed gas storage volumes into a first receiving vessel, the first of the plurality of compressed gas storage volumes initially at a first pressure, $P_1$, where $P_{LOWER}<P_1\leq P_{UPPER}$;
(b) terminating dispensing from the first of the plurality of compressed gas storage volumes when the pressure in the first of the plurality of compressed gas storage volumes is within 7.5 MPa of $P_{LOWER}$ wherein the dispensing is terminated without regard to the pressure difference between the first compressed gas storage volume and the first receiving vessel;
(c) subsequent to step (b), dispensing from a second of the plurality of compressed gas storage volumes into the first receiving vessel, the second of the plurality of compressed gas storage volumes initially at a second pressure, $P_2$, where $P_{LOWER}<P_2\leq P_{UPPER}$;
(d) terminating dispensing from the second of the plurality of compressed gas storage volumes when the first receiving vessel is filled to a desired level for the first receiving vessel; and
introducing compressed gas into the first of the plurality of compressed gas storage volumes at least until the pressure in the first of the plurality of compressed gas storage volumes is within 7.5 MPa of $P_{UPPER}$;
whereby the pressure in each of the plurality of compressed gas storage volumes is cycled through pressure cycles during which compressed gas is withdrawn from each of the plurality of compressed gas storage volumes and compressed gas is introduced into each of the plurality of compressed gas storage volumes, the pressure cycles for each of the plurality of compressed gas storage volumes independent from one another, the pressure cycles for each of the plurality of compressed gas storage volumes having a pressure decrease portion and a pressure increase portion subsequent to the pressure decrease portion, wherein the pressure during the pressure decrease portion progresses from within 7.5 MPa of $P_{UPPER}$ to within 7.5 MPa of $P_{LOWER}$ and the pressure increase portion progresses from within 7.5 MPa of $P_{LOWER}$ to within 7.5 MPa of $P_{UPPER}$, wherein the pressure in each of the compressed gas storage volumes is not increased at any time during the pressure decrease portion of the pressure cycles and the pressure in each of the compressed gas storage volumes is not decreased at any time during the pressure increase portion of the pressure cycles;
wherein compressed gas is introduced into the first of the plurality of compressed gas storage volumes from a compressed gas source during step (a), and/or compressed gas is introduced into the second of the plurality of compressed gas storage volumes from a compressed gas source during step (c).

13. A method for dispensing a compressed gas from a plurality of more than two compressed gas storage volumes, wherein the plurality of compressed gas storage volumes are operated each in a pressure range ranging from a lower gas storage pressure, $P_{LOWER}$, to an upper gas storage pressure, $P_{UPPER}$, inclusive, the method comprising:
(a) dispensing from a first of the plurality of compressed gas storage volumes into a first receiving vessel, the first of the plurality of compressed gas storage volumes initially at a first pressure, $P_1$, where $P_{LOWER}<P_1\leq P_{UPPER}$;
(b) terminating dispensing from the first of the plurality of compressed gas storage volumes when the pressure in the first of the plurality of compressed gas storage volumes is within 7.5 MPa of $P_{LOWER}$ wherein the dispensing is terminated without regard to the pressure difference between the first compressed gas storage volume and the first receiving vessel;
(c) subsequent to step (b), dispensing from a second of the plurality of compressed gas storage volumes into the first receiving vessel, the second of the plurality of compressed gas storage volumes initially at a second pressure, $P_2$, where $P_{LOWER}<P_2\leq P_{UPPER}$;
(d) terminating dispensing from the second of the plurality of compressed gas storage volumes when the first receiving vessel is filled to a desired level for the first receiving vessel; and
introducing compressed gas into the first of the plurality of compressed gas storage volumes at least until the pressure in the first of the plurality of compressed gas storage volumes is within 7.5 MPa of $P_{UPPER}$;
whereby the pressure in each of the plurality of compressed gas storage volumes is cycled through pressure cycles during which compressed gas is withdrawn from each of the plurality of compressed gas storage volumes and compressed gas is introduced into each of the plurality of compressed gas storage volumes, the pressure cycles for each of the plurality of compressed gas storage volumes independent from one another, the pressure cycles for each of the plurality of compressed gas storage volumes having a pressure decrease portion and a pressure increase portion subsequent to the pressure decrease portion, wherein the pressure during the pressure decrease portion progresses from within 7.5 MPa of $P_{UPPER}$ to within 7.5 MPa of $P_{LOWER}$ and the pressure increase portion progresses from within 7.5 MPa of $P_{LOWER}$ to within 7.5 MPa of $P_{UPPER}$, wherein the pressure in each of the compressed gas storage volumes is not increased at any time during the pressure decrease portion of the pressure cycles and the pressure in each of the compressed gas storage volumes is not decreased at any time during the pressure increase portion of the pressure cycles;
wherein during step (a) and/or during step (c), compressed gas is also introduced into the first receiving vessel from a compressor.

\* \* \* \* \*